US005465315A

United States Patent [19]

Sakai et al.

[11] Patent Number: 5,465,315
[45] Date of Patent: Nov. 7, 1995

[54] DISPLAY APPARATUS HAVING A PLURALITY OF DISPLAY DEVICES

[75] Inventors: Keiji Sakai; Yoshio Yoshida, both of Nara; Hiroyuki Yamamoto; Yukio Kurata, both of Tenri; Yasuo Nakata, Nara; Takahiro Miyake, Kyoto, all of Japan

[73] Assignee: Sharp Kabushiki Kaisha, Osaka, Japan

[21] Appl. No.: 986,052

[22] Filed: Dec. 2, 1992

[30] Foreign Application Priority Data

| Dec. 2, 1991 | [JP] | Japan | 3-318190 |
| Dec. 2, 1991 | [JP] | Japan | 3-318191 |
| Jan. 17, 1992 | [JP] | Japan | 4-006810 |
| Jan. 17, 1992 | [JP] | Japan | 4-006813 |
| Jan. 24, 1992 | [JP] | Japan | 4-010648 |
| Jan. 24, 1992 | [JP] | Japan | 4-010649 |
| Jan. 28, 1992 | [JP] | Japan | 4-013392 |

[51] Int. Cl.$^6$ ................................................. G02B 6/08
[52] U.S. Cl. .............................. 385/116; 385/120; 385/901
[58] Field of Search ............................ 385/115, 116, 385/119, 120, 121, 901

[56] References Cited

U.S. PATENT DOCUMENTS

| 3,445,273 | 5/1969 | Gallagher | 385/120 X |
| 3,544,192 | 12/1970 | Goldstein | 385/121 |
| 3,853,658 | 12/1974 | Ney | 385/116 X |
| 4,076,978 | 2/1978 | Brennan et al. | 385/120 X |
| 4,116,739 | 9/1978 | Glenn | 385/120 X |
| 4,139,261 | 2/1979 | Hilsum | 385/120 |
| 4,557,581 | 12/1985 | Woolley et al. | 385/120 X |
| 4,743,090 | 5/1988 | Reidinger | 385/120 |
| 5,129,028 | 7/1992 | Soltan | 385/120 |
| 5,131,065 | 7/1992 | Briggs et al. | 385/120 |
| 5,136,677 | 8/1992 | Drexhage et al. | 385/120 X |

FOREIGN PATENT DOCUMENTS

| 0017922 | 10/1980 | European Pat. Off. . |
| 0424969 | 5/1991 | European Pat. Off. . |
| 0425371 | 5/1991 | European Pat. Off. . |
| 0485235 | 5/1992 | European Pat. Off. . |
| 2116913 | 7/1972 | France . |
| 2168861 | 9/1973 | France . |

(List continued on next page.)

OTHER PUBLICATIONS

*Patent Abstracts of Japan*, vol. 8, No. 97, (P–272) (1534) May 8, 1984.
*Patent Abstracts of Japan*, vol. 7, No. 228, (P–228) (1373) Oct. 8, 1983.

Primary Examiner—John D. Lee
Attorney, Agent, or Firm—Morrison & Foerster

[57] ABSTRACT

A display apparatus of the invention includes: a plurality of display devices arranged in one direction, each of the plurality of display devices having a display area; and a plurality of image transmission means corresponding to the respective display devices, one end face of each of the image transmission means being coupled to a display area of the corresponding one of the display devices, other end faces of the image transmission means corresponding to the adjacent ones of the display devices being in contact with each other, the plurality of image transmission means being bent toward the one direction in which the display devices are arranged. Alternatively, a display apparatus of the invention includes: a plurality of display devices disposed in two directions, each of the plurality of display devices having a display area; a plurality of image transmission means corresponding to the respective display devices, one end face of each of the image transmission means being coupled to a display area of the corresponding one of the display devices, other end faces of the image transmission means corresponding to the adjacent ones of the display devices being in contact with each other, some of the plurality of image transmission means each having inward facing slopes and outward facing slopes on two pairs of opposing faces, the outward facing slopes of the image transmission means being directed to a direction in which the corresponding display device has no adjacent display devices.

15 Claims, 24 Drawing Sheets

FOREIGN PATENT DOCUMENTS

| | | |
|---|---|---|
| 2561398 | 9/1985 | France . |
| 3125317 | 4/1982 | Germany . |
| 59-105677 | 6/1984 | Japan . |
| 60-169833 | 9/1985 | Japan . |
| 60-216311 | 10/1985 | Japan . |
| 63-175882 | 7/1988 | Japan . |
| 63-250680 | 10/1988 | Japan . |
| 63-271284 | 11/1988 | Japan . |
| 1-189616 | 7/1989 | Japan . |
| 1-189613 | 7/1989 | Japan ................................ 385/901 |
| 2-149883 | 6/1990 | Japan . |
| 2-271387 | 11/1990 | Japan . |
| 3-2723 | 1/1991 | Japan . |
| 2148570 | 5/1985 | United Kingdom . |
| WO90/12384 | 10/1990 | WIPO . |
| WO91/07681 | 5/1991 | WIPO . |

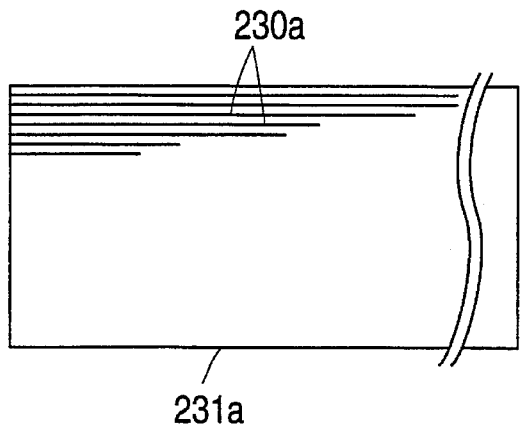
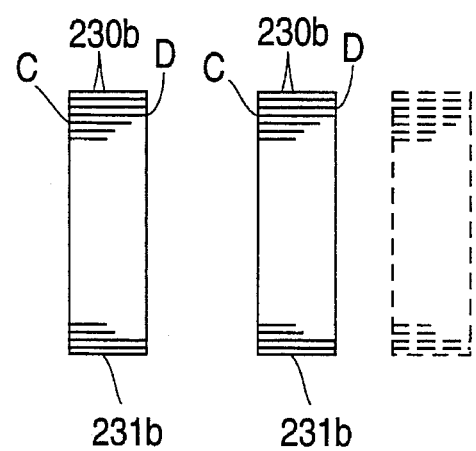
FIG. 14A  FIG. 14B
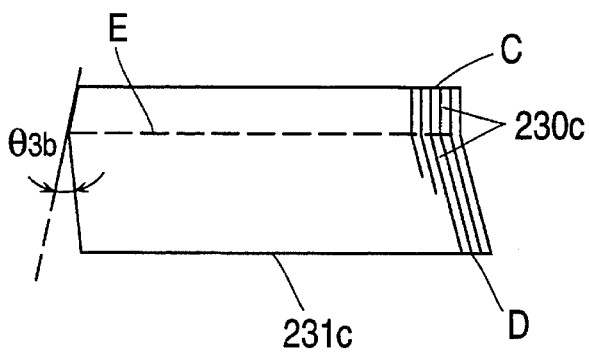
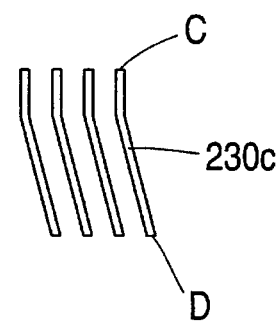
FIG. 14C  FIG. 14D
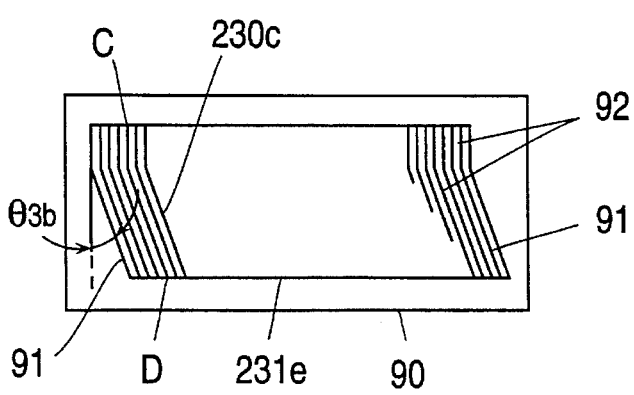
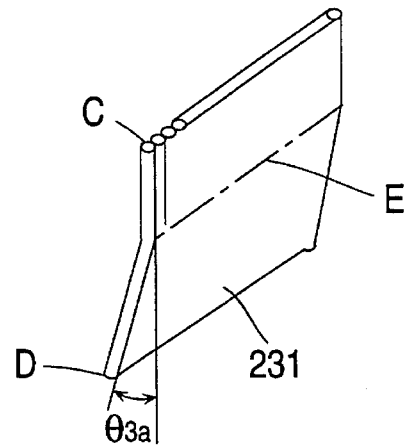
FIG. 14E  FIG. 14F

DISPLAY APPARATUS HAVING A PLURALITY OF DISPLAY DEVICES

BACKGROUND OF THE INVENTION

1. Field of the Invention

The present invention relates to a display apparatus having a plurality of display devices by which a single image is displayed.

2. Description of the Related Art

Generally, with a display apparatus there are various factors which determine visual comfort, such as brightness, contrast, whiteness, blackness, color range, screen size, and other visual characteristics. Among various types of display apparatuses, a liquid crystal display (LCD) apparatus is superior to others in brightness, contrast, whiteness and blackness, considering its small consumption of electricity and its ability to be driven by a low voltage. Moreover, the LCD apparatus can relatively easily provide a color display. The LCD apparatus can be constructed in a flat panel, and hence has an advantage that the thickness (i.e., depth) of the apparatus can be made considerably smaller than that of a conventional cathode ray tube (CRT). As a result, the LCD apparatus is becoming more popular in various fields of use.

Such an LCD apparatus has a structure in which liquid crystal is confined between a pair of substrates facing each other at a distance on the order of microns and having transparent electrodes thereon. Therefore, if fine dirt, dust or the like is mixed into or becomes adhered to the inside of the apparatus during the production process, the dirt or dust prevents the apparatus from operating properly. In particular, faulty picture elements are more likely to occur. In addition, due to the above-mentioned structure, a larger screen size has a higher probability of there being an occurrence of fault picture elements, i.e., the fault rate of a display apparatus having a larger screen size is higher. As to an LCD apparatus in which such faulty picture elements occur, the display quality is largely deteriorated. Therefore, the LCD apparatus is disposed or discarded.

As described above, in an LCD apparatus, a larger screen size results in a higher fault rate due to faulty picture elements. Especially when the screen size is on the order of 15 inches or larger, it is very difficult to mass-produce such an LCD apparatus at reasonable production costs.

In order to overcome this problem, a plurality of minor LCD devices having a screen size of 15 inches or smaller are arranged lengthwise and widthwise in an array pattern, so as to constitute a single LCD apparatus having a large display area. An example is shown in FIG. 1A. In FIG. 1A, nine minor LCD devices 1 are arranged in a 3×3 array. With this construction, if each minor LCD device 1 is, for example, of a 14-inch square type, the screen size of a resulting large-sized LCD apparatus 2 will be approximately 42 inches by 42 inches.

However, each of the minor LCD devices 1 have a non-image area 1b on which an image is not displayed along the periphery of a display area 1a on which an image is displayed, as is shown in FIG. 1B. For example, the non-image area 1b having a width of at least 3 millimeters (mm) is formed by a space for containing the liquid crystal confined between the two opposing substrates, and a space for disposing wiring and the like for applying a voltage to the minor LCD device 1 so as to drive the picture elements. Accordingly, as is shown in FIG. 1A, the resulting LCD apparatus 2 has the non-image areas 1b in a shape of a lattice surrounding the respective display areas 1a, i.e., the display area of the resulting LCD apparatus 2 is discontinuous (by seams). As a result, the display quality is deteriorated and therefore the displayed image may be erroneously displayed and/or viewed.

In order to solve the problem mentioned above, a display apparatus has been proposed in Japanese Patent Application No. 3-293425 by the inventors of the present invention. According to this display apparatus, a single display area is formed by a plurality of display devices, and an image can be displayed on the display area without discontinuity. A fundamental structure of such a display apparatus is shown in FIG. 2.

The proposed display apparatus includes, for example, two display devices 11 and 12 provided with display areas 11a and 12a, respectively, juxtaposed along a direction A, as is shown in FIG. 2. To each of the display areas 11a and 12a, end faces D of optical fiber bundles 3 for transmitting an image are connected. On the other end faces C of the optical fiber bundles 3, a composite image having no boundary area appears. Each optical fiber bundle 3 is made up of a plurality of parallel optical fibers 3' which are bent at an angle $\theta_1$ at a predetermined point (a point E in FIG. 2). In the display apparatus shown in FIG. 2, the display devices 11 and 12 are separately formed, but in another case, display devices 13 and 14 may be adjacently formed, as is shown in FIG. 3.

In the display apparatus shown in FIG. 2, an image signal representing an image which is displayed on the display areas 11a and 12a of the display devices 11 and 12 is introduced into the optical fiber bundles 3 at their one end faces D, transmitted through the optical fiber bundles 3, and emitted from the other end faces C.

A method of forming the optical fiber bundles 3 is now described. First, as is shown in FIG. 4, optical fibers 31 having the same length are arranged side by side, and are then fastened to each other so as to form an optical fiber sheet 32. Next, as is shown in FIG. 5, the optical fiber sheet 32 is bent in a direction perpendicular to away from the arranged direction of the optical fibers 31 so that the portions of the optical fiber sheet 32 on the sides of the introducing end face D and the emitting end face C form a bent angle $\theta_1$. Thus, a bent optical fiber sheet 33 is formed. A plurality of bent optical fiber sheets 33 are stacked in a direction in which the optical fiber sheet 32 is bent, so as to form the optical fiber bundle 3 as a unit of the display area 11a or 12a.

Referring briefly to FIG. 3, each optical fiber bundle 3 has an outward facing slope 3c and an inward facing slope 3d on opposing side faces of the stacked bent optical fiber sheets 32. The emitting end faces C of the optical fibers 31 which form the optical fiber bundle 3 are made flat, and the optical fibers 31 are arranged at regular pitches.

FIG. 6 shows a partial sectional view of the optical fiber bundle 3. Each of the optical fibers 31 making up the optical fiber bundle 3 has a core portion 31a and a clad portion 31b which has a lower refractive index than that of the core portion 31a. The optical fibers 31 are fixed to each other using a suitable adhesive 34.

Finally, two optical fiber bundles 3 constructed in the above-described manner are joined so as to form a display apparatus. At this time, the optical fiber bundles 3 are joined so that the outward facing slopes 3c thereof do not interfere with each other. For this reason, the optical fiber bundles 3 preferably are joined such that vertical side faces 3e extending from the inward facing the side of the slopes 3d are connected.

With the above construction, a display apparatus having a display area double the size of the display area 11a (12a) of one display device 11 (12) can be obtained. The two display devices 11 and 12 are driven through a driving circuit (not shown) using split signals. The split signals are obtained by splitting an image signal for each frame into two signals, e.g., a corresponding signal for the right and left fields. Therefore, the image appearing on the display areas 11a and 12a is displayed as a composite image on the emitting ends faces C of the combined optical fiber bundles 3 without discontinuity.

The number of the display devices which are joined is not limited to two, and a resulting display apparatus may be formed by three display devices joined in a direction A, as is shown in FIG. 7. In this display apparatus, an optical fiber bundle 35 which is not bent is interposed and joined between the two optical fiber bundles 3 which are bent in the same way as in the above example having two display devices. With such a construction, a thin display apparatus having a display area three times the size of a display area 15a (16a, 17a) of one display device 15 (16, 17) is provided. However, it is difficult to join four or more optical fiber bundles 3 because the outward facing slopes 3c on the introducing end face side interfere with each other. Also, it is difficult to add another optical fiber bundle 3 in a direction B perpendicular to the direction A. If there exists no non-image area 1b, a number of display devices can be joined with each other. However, as described above, since a resulting display apparatus unavoidably has the non-image areas 1b, it is substantially impossible to realize such joining.

Regarding the bent angle $\theta_1$ of the optical fiber bundle 3, when the angle $\theta_1$ is small, a distance L (FIG. 1) between the introducing end face D and the emitting end face C is long. Therefore, it is required to make the bent angle $\theta_1$ larger in order to realize a thin display apparatus. However, according to the above-described approach, it is difficult to make the bent angle $\theta_1$ larger without disordering the arrangement of the optical fibers 31.

In the above display apparatus, the emitting end face C of the optical fiber bundles 3 for transmitting an image signal is made even, so that the viewing angle corresponding to the emitting angle of the optical fiber bundle 3 is small. As a result, the display apparatus has a disadvantage that if the viewing angle with respect to the display screen is changed only a little, the displayed image cannot be seen.

There are methods for enlarging the viewing angle including a method of roughening the emitting end face C of the optical fiber bundle 3, a method of making the emitting end of each of the optical fibers 31 into a lens-like shape (Japanese Laid-Open Patent Publication No. 60-169833), and a method of disposing a scattering plate or a microlens array sheet on the emitting end face C of the optical fiber bundle 3 (Japanese Laid-Open Patent Publication No. 1-189616). However, although the viewing angle can be enlarged by the roughening method for the optical fiber bundle 3 and the method of forming a scattering plate, the light from the outside is more largely scattered on the display screen as the visual angle is enlarged. This causes a problem in that the displayed image is whitish and the image quality is deteriorated. By the method of disposing a microlens array sheet, the microlens array sheet is expensive, thereby disadvantageously increasing the production cost. By the method of making the end of the optical fiber into a lens-like shape, the process is difficult to perform, whereby production efficiency decreases. As mentioned above, any one of the conventional methods cannot satisfactorily attain the purpose of enlarging the viewing angle.

Moreover, there exists another problem in that the arrangement of the optical fibers 31 is disordered when the optical fiber bundle 3 is produced. Especially with respect to the method of disposing a microlens array sheet, it is important to align the optical fibers 31 and the microlens array. Accordingly, it is difficult to use the method with the disarranged or disordered optical fibers 31 in combination with the microlens array.

In addition, as is seen from FIG. 6, in the optical fiber bundle 3, the core portions 31a occupy a relatively small volume of the optical fiber bundle 3 due to the presence of the clad portions 31b and the spacing between respective clad portions. Since light which is introduced into the clad portions 31b is not transmitted, this causes a problem in that an image appearing on the emitting end face C is dark and the image quality is deteriorated.

Moreover, the end faces C of the optical fiber bundle 3 are always exposed to the air. The core portion 31a of the optical fiber 31 is made of acrylic, so that the core portion 31a tends to absorb moisture in the air from the exposed ends and to expand and shrink repeatedly. Because of this, the optical fiber bundle 3 may be cracked, and hence the displayed image quality may be distorted. A small gap unavoidably occurs between the periphery of the introducing end face D of the optical fiber bundle 3 and the periphery of the display device 11, 12, . . . . In some cases, fine dirt may enter from the small gap. This partially prevents an image signal from transmitting, and faulty picture elements occur in the display area 11a, 12a, . . . of the display device 11, 12, . . . Sometimes, the acrylic core portions 31a may absorb moisture from the small gap, which causes the optical fiber bundle 3 to be cracked. As a result of such faulty picture elements and the crack of the optical fiber bundle 3, a black line or lines appears on the screen, which degrades the reliability and durability of the display apparatus.

SUMMARY OF THE INVENTION

The display apparatus of this invention includes: a plurality of display devices arranged in one direction, each of the plurality of display devices having a display area; and a plurality of image transmission means corresponding to the respective display devices, one end face of each of the image transmission means being coupled to a display area of the corresponding one of the display devices, other end faces of the image transmission means corresponding to the adjacent ones of the display devices being in contact with each other, the plurality of image transmission means being bent toward the one direction in which the display devices are arranged.

In a preferred embodiment, the image transmission means is formed by stacking a plurality of optical fiber sheets in which a plurality of optical fibers are arranged side by side.

According to another aspect of the present invention, a display apparatus is provided. The display apparatus includes: a plurality of display devices disposed in two directions, each of the plurality of display devices having a display area; a plurality of image transmission means corresponding to the respective display devices, one end face of each of the image transmission means being coupled to a display area of the corresponding one of the display devices, other end faces of the image transmission means corresponding to the adjacent ones of the display devices being in contact with each other, some of the plurality of image transmission means each having inward facing slopes and outward facing slopes on two pairs of opposing faces, the outward facing slopes of the image transmission means being directed to a direction in which the corresponding display device has no adjacent display devices.

According to another aspect of the present invention, a method of producing an optical fiber sheet is provided. The method includes the steps of: bending an optical fiber sheet along a line in a direction across a surface of the optical fiber sheet, the optical fiber sheet being formed by arranging a plurality of optical fibers side by side, the line being distant from one end of the optical fiber sheet; separating the bent optical fiber sheet into a plurality of bent optical fibers; forming an optical fiber sheet having a bent line by arranging the plurality of bent optical fibers in a direction toward which the optical fibers are bent; and bending the optical fiber sheet having the bent line along the bent line in a direction across a surface of the optical fiber sheet.

According to another aspect of the present invention, a display apparatus is provide. The display apparatus includes: a display device having a display area; and image transmission means, one end face of the image transmission means being coupled to the image area, an other end face of the image transmission means taking a convex and concave form.

In a preferred embodiment, the image transmission means is formed by stacking a plurality of optical fiber sheets in which a plurality of optical fibers are arranged side by side.

In a preferred embodiment, the convex and concave form has a predetermined period, the predetermined period being equal to or shorter than that of the arrangement of the optical fibers.

In a preferred embodiment, the image transmission means comprising an optical fiber bundle formed by stacking a plurality of optical fiber sheets in which a plurality of optical fibers are arranged side by side, and a sheet having a convex and concave form formed on one end face of the optical fiber bundle.

According to still another aspect of the present invention, a method of treating an end face of an optical fiber integer is provided. The method includes the steps of: forming a photosensitive resin layer on one end face of the optical fiber integer comprising a plurality of optical fibers having core and clad portions; exposing part of the photosensitive resin layer on the core portion by introducing light from the other end face of the optical fiber integer; and removing unexposed part of the photosensitive resin layer.

According to another aspect of the present invention, a display apparatus is provided. The display apparatus includes: a display device having a display area; and an image transmission means comprising a plurality of light transmitters having only core portions and an adhesive member having a refractive index lower than that of the light transmitters, gaps between the plurality of light transmitters being filled with the adhesive member, one end face of the image transmission means being coupled to the display area.

According to still another aspect of the present invention, a method of producing an optical fiber integer is provided. The method includes the steps of: putting optical fibers through a plurality of holes formed at the same positions in two plates; bending the optical fibers at a desired angle by shifting one of the two plates; fixing the bent optical fibers to each other using an adhesive; and removing the two plates.

In a preferred embodiment, the optical fibers have only core portions.

According to another aspect of the present invention, a display apparatus is provided. The display apparatus includes: a display device having a display area; and image transmission means having anti-moisture permeation film on both end portions, one end face of the image transmission means being coupled to the display area.

According to another aspect of the present invention, a display apparatus is provided. The display apparatus includes: a display device having a display area; image transmission means, one end face of the image transmission means being coupled to the display area; and sealing means covering a portion where the image transmission means is coupled to the display area.

Thus, the invention described herein makes possible the advantages of (1) providing a display apparatus with a larger screen size without discontinuity as compared to conventional display apparatuses, (2) providing a display apparatus in which the viewing angle for the display area can be easily made wide at a low cost, (3) providing a display apparatus in which the brightness of the display area can be improved and hence the image quality can be improved, and (4) providing a display apparatus in which faulty picture elements or the like are prevented from occurring, and hence the reliability and durability of the display apparatus is enhanced.

These and other advantages of the present invention will become apparent to those skilled in the art upon reading and understanding the following detailed description with reference to the accompanying figures.

BRIEF DESCRIPTION OF THE DRAWINGS

FIGS. 14A to 14F are views illustrating a method of fabricating the optical fiber sheet used in the display apparatus of FIG. 11.

DESCRIPTION OF THE PREFERRED EMBODIMENTS

The present invention will be described with respect to examples. EXAMPLE 1

Figure 8:
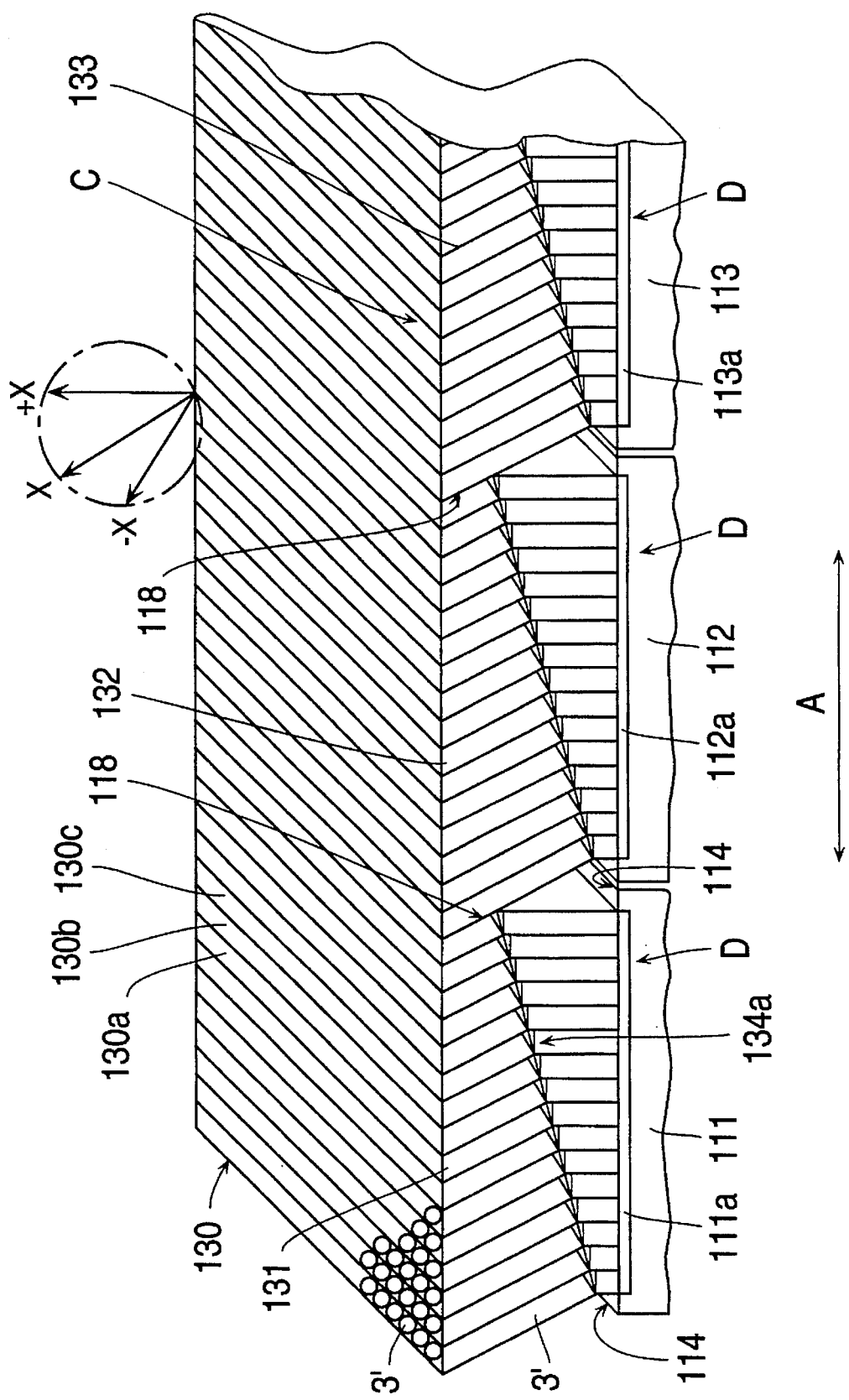
FIG. 8 is a perspective view showing a display apparatus according to a first example of the present invention.

FIG. 8 is a partial front view showing a display apparatus of this example. The display apparatus includes two or more display devices, e.g., three display devices 111, 112 and 113. The display devices 111, 112 and 113 have display areas 111a, 112a and 113a, respectively. The display areas 111a, 112a and 113a are separated from each other by boundary areas 114 (i.e., non-image areas). Connected to the separated display areas 111a, 112a and 113a, are introducing end faces D of optical fiber bundles 131, 132 and 133, each of such bundles being for transmitting an image.

Each of the optical fiber bundles 131, 132 and 133 is formed in the following manner. A plurality of optical fibers 3' are arranged side by side, so as to form an optical fiber sheet 130 (shown in perspective). A plurality of optical fiber sheets (e.g., 130a, 130b, 130c) are stacked and the optical fibers 3' in each are then bent in the same direction toward a boundary area 114 at certain portions 134a between the introducing end face D and an emitting end face C. The adjacent side faces 118 on the emitting end face C side of two respective adjacent optical fiber bundles, i.e., 131 and 132, and 132 and 133 are in contact with each other and fixed with an adhesive or the like. The length of each optical fiber 3' is determined by the width of the boundary area 114, the angle at which the optical fiber 3' to be bent and the length of a straight portion of the optical fiber 3'. In view of the resulting display apparatus, it is preferable that the display apparatus is as thin as possible, i.e., the optical fiber 3' is as short as possible. Also, a preferred value of the diameter depends on the screen size and the resolution of the composite display area. Preferably, the diameter of the optical fiber 3' is set to be 250 μm or less. The optical fiber bundles 131, 132 and 133 are formed in the same way and hence have the same construction.

Figure 9:
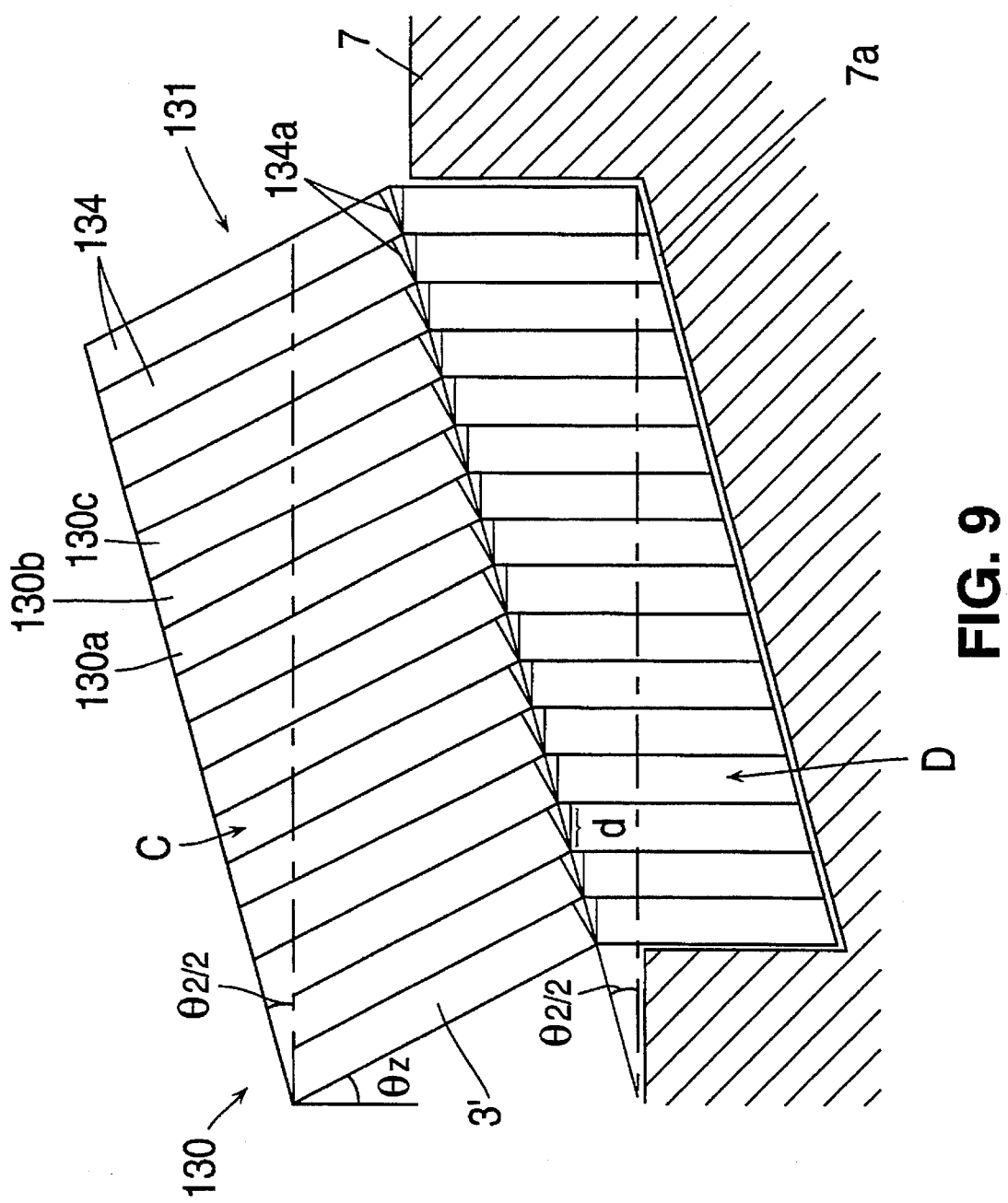
FIG. 9 is a view for illustrating a method of fabricating an optical fiber bundle used in the display apparatus of FIG. 8.

Next, by way of an example, a method of fabricating the optical fiber bundle 131 is described with reference to FIG. 9. First, a plurality of optical fibers 3' are arranged side by side and then cut to have a same prescribed length, so as to form an optical fiber sheet 130. The optical fiber sheet 130 is bent at an angle $\theta_2$ at a predetermined location 134a thereof, so as to form an optical fiber sheet 130 having the bent portion at location 134a. A plurality of optical fiber sheets 130 are inserted and stacked adjacent one another as shown in FIG. 9 in a groove 7a having a gradient bottom formed in a jig 7. At this time, the gradient of the bottom of the groove 7a is an angle of $\theta_2/2$ with respect to the angle $\theta_2$. This is because the angle formed by the direction of the diameter d of an optical fiber and the center of the bent portion 134a indicated by a dot-chain line is half the bent angle $\theta_2$ formed by the portions of the optical fiber sheet 130 on the sides of the introducing end face D and the emitting end face C. Next, the stacked optical fiber sheets 130 are fixed together using a resin or the like. The fixed optical fiber sheets 130 are then cut along the two-dot chain lines shown in FIG. 9 to form the introducing end face D and the emitting end face C, so as to compete the optical fiber bundle 131. The other optical fiber bundles 132 and 133 are also fabricated by the same way.

The bent angle $\theta_2$ is required to be selected so that when the introducing end faces of the optical fiber bundles 131, 132 and 133 are connected to the corresponding display areas 111a, 112a and 113a, the respective two adjacent optical fiber bundles 131 and 132, and 132 and 133 are in contact with each other on the emitting end face C side. By selecting the bent angle appropriately, the emitting end faces C of the optical fiber bundles 131, 132 and 133 can be in contact with each other irrespective of the spaces between the display areas 111a, 112a and 113a.

Therefore, according to the display apparatus of this example, even if the display areas 111a, 112a and 113a of three display devices 111, 112 and 113 are separated from each other, a composite image without boundary can be obtained by the optical fiber bundles 131, 132 and 133. In the display apparatus having the above construction, the direction along the axis of each of the optical fibers at the emitting end face C is oblique with respect to the display areas 111a, 112a and 113a, whereby the display apparatus has a disadvantage that the visual angle range is narrow. However, since there is a range of ±X with respect to the center direction X in the diameter direction of the optical fiber, the viewing angle range may not cause a problem depending on the position where the display apparatus is set, or the direction which the display area of the display apparatus faces.

The display apparatus to which the invention can be applied is not limited to a display apparatus having three display devices, but the invention can be applied to a display apparatus in which any number of display areas of display devices are arranged in one direction.

Figure 10:
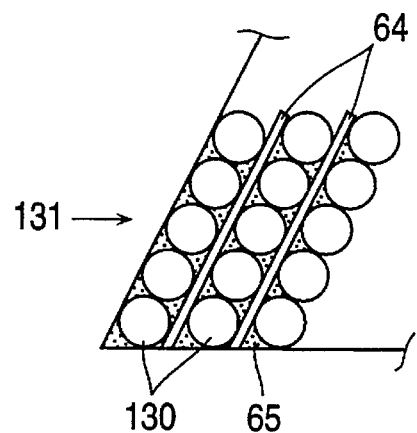
FIG. 10 is a sectional view showing the optical fiber bundle.

The method of fabricating the optical fiber bundle 131 is not limited to the above. Alternatively, straight optical fiber sheets are stacked in a group, and then the stacked group of optical fiber sheets is bent as a whole so as to form the optical fiber bundle 131. The structure of the optical fiber bundle 131 is also not limited to the above. Alternatively, as is shown in FIG. 10, spacers 64 may be inserted between the bent optical fiber sheets 130 and gaps between the optical fiber sheets 130 and the spacers 64 may be filled with an adhesive 65. When the spacers 64 are used, the thickness of the optical fiber bundle 131 can be reduced, as is disclosed in Japanese Patent Application No. 3-293425. Preferably, the spacers 64 are black in order to decrease the crosstalk from adjacent optical fibers 3' and to enhance the black-mask effect. EXAMPLE 2

Figure 11:
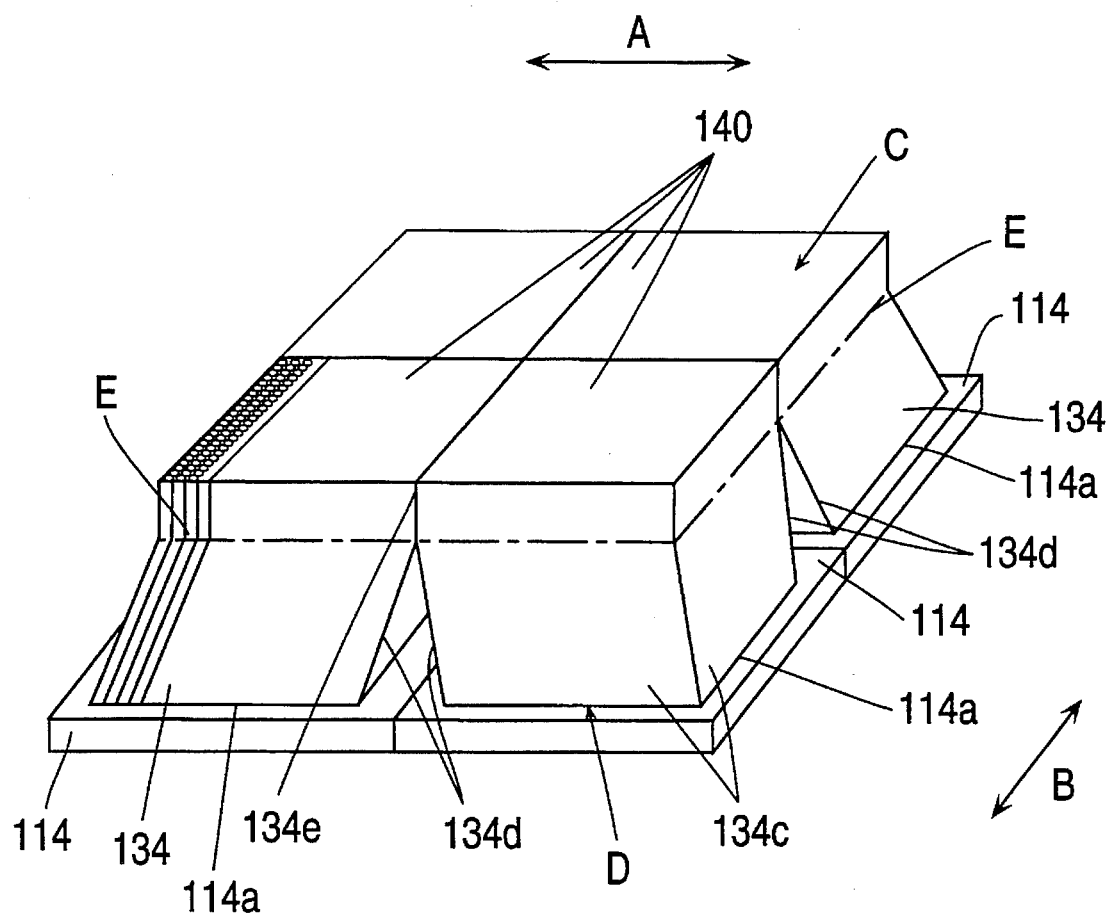
FIG. 11 is a perspective view showing a display apparatus according to a second example of the present invention.

FIG. 11 shows a display apparatus according to another example of the invention. The display apparatus of this example includes two display devices 114 juxtaposed in a direction A and two display devices 114 juxtaposed in a direction B, i.e., four display devices 114, and an optical fiber bundle group 140 which is connected to the display devices 114. The display devices 114 have respective display areas 114a. The optical fiber bundle group 140 is made up of four optical fiber bundles 134. One end face D of each of the optical fiber bundle 134 is connected to the corresponding one of the display areas 114a. Each of the optical fiber bundles 134 has two outward facing slopes 134c on adjacent side faces and two inward facing slopes 134d on the remaining side faces. The optical fiber bundles 134 are joined at their side faces 134e in such a manner that the outgoing slopes 134c face outside. In this way, the emitting end face C of the optical fiber bundle group 140 connected to the display areas 114a of the four display devices 114 serves as a plane of a composite display area.

Figure 12:
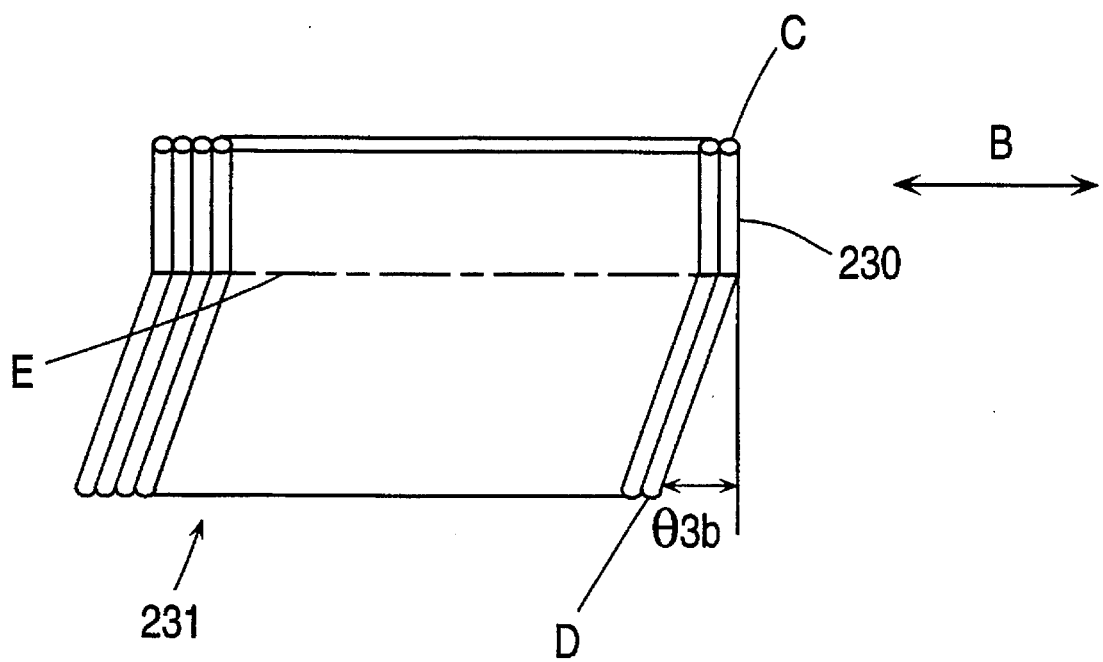
FIG. 12 is a side view showing an optical fiber sheet used in the display apparatus of FIG. 11.
Figure 13:
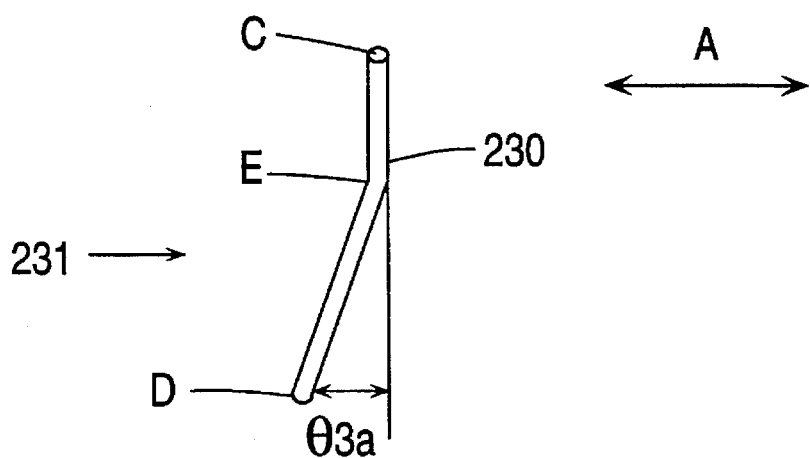
FIG. 13 is a front view showing the optical fiber sheet used in the display apparatus of FIG. 11.

Each of the optical fiber bundles 134 has a structure in which a plurality of optical fiber sheets 231 shown in FIGS. 12 and 13 are stacked in a direction A. The optical fiber sheet 231 is obtained in the following manner. A plurality of optical fibers 230 which are cut to have the same length are arranged side by side in a direction B and bonded to be a sheet-like shape. Moreover, the optical fiber sheet 231 is bent at a prescribed angle $\theta_{3b}$ in a direction B along a portion (line) E, for example, positioned at approximately one-third the length from the emitting end face C to the introducing end face D, as is shown in FIG. 12. The optical fiber sheet 231 is also bent at a prescribed angle $\theta_{3a}$ in a direction A at the portion E, as is shown in FIG. 13. Each of the optical fibers 230 has a core portion formed of acrylic as its center axis. Light which is introduced into the optical fiber 230 from one end is emitted from the other end. The values of the angles $\theta_{3a}$ and $\theta_{3b}$ are selected depending on the separated intervals between the adjacent display areas 114a, the position of the bent portion E, and the like. The values of the angles $\theta_{3a}$ and $\theta_{3b}$ may be the same value.

An exemplary fabrication method of the optical fiber sheet 231 is described with reference to FIGS. 14A through 14E. First, as is shown in FIG. 14A, a plurality of long optical fibers 230a are arranged in parallel and then bonded with a water-soluble adhesive, so as to form a long optical fiber sheet 231a. Then, the long optical fiber sheet 231a is cut into optical fiber sheets 231b each having a prescribed length, as is shown in FIG. 14B. The optical fiber sheet 231b is bent at an angle $\theta_{3b}$ along the bent line E and in a direction along a line across the surface of the optical sheet 231b, so as to form a bent optical fiber sheet 231c, as is shown in FIG. 14C.

Next, the bent optical fiber sheet 231c is dipped in a water. As a result, the water-soluble adhesion is dissolved, and the bent optical fiber sheet 231c is divided into a plurality of bent optical fibers 230c, as is shown in FIG. 14D. The optical fibers 230c which are bent at the angle $\theta_{3b}$ are arranged within a form 90. In the form 90 having a recessed portion, as is shown in FIG. 14E, both edges 91 of the recessed portion are bent at the angle $\theta_{3b}$ the same as the optical fiber 230c. At the bottom of the recessed portion, a plurality of alignment grooves 92 are formed for aligning the optical fibers 230c at regular pitches. The optical fibers 230c are arranged in the recessed portion of the form 90 and bonded with a water-soluble adhesive. Thus, an optical fiber sheets 231e which is bent at the angle $\theta_{3b}$ in a direction parallel to the arranged direction of the optical fibers 230c is obtained. As a last step, as is shown in FIG. 14F, the optical fiber sheet 231e is bent at the angle $\theta_{3a}$ along the line E in a direction along a line across the surface of the optical fiber sheet 231e, so as to obtain the optical fiber sheet 231.

According to the display apparatus of this example, a display area having a size four times as large as that of the display area 114a of one of the display device 114 without seams can be obtained.

Figure 15:
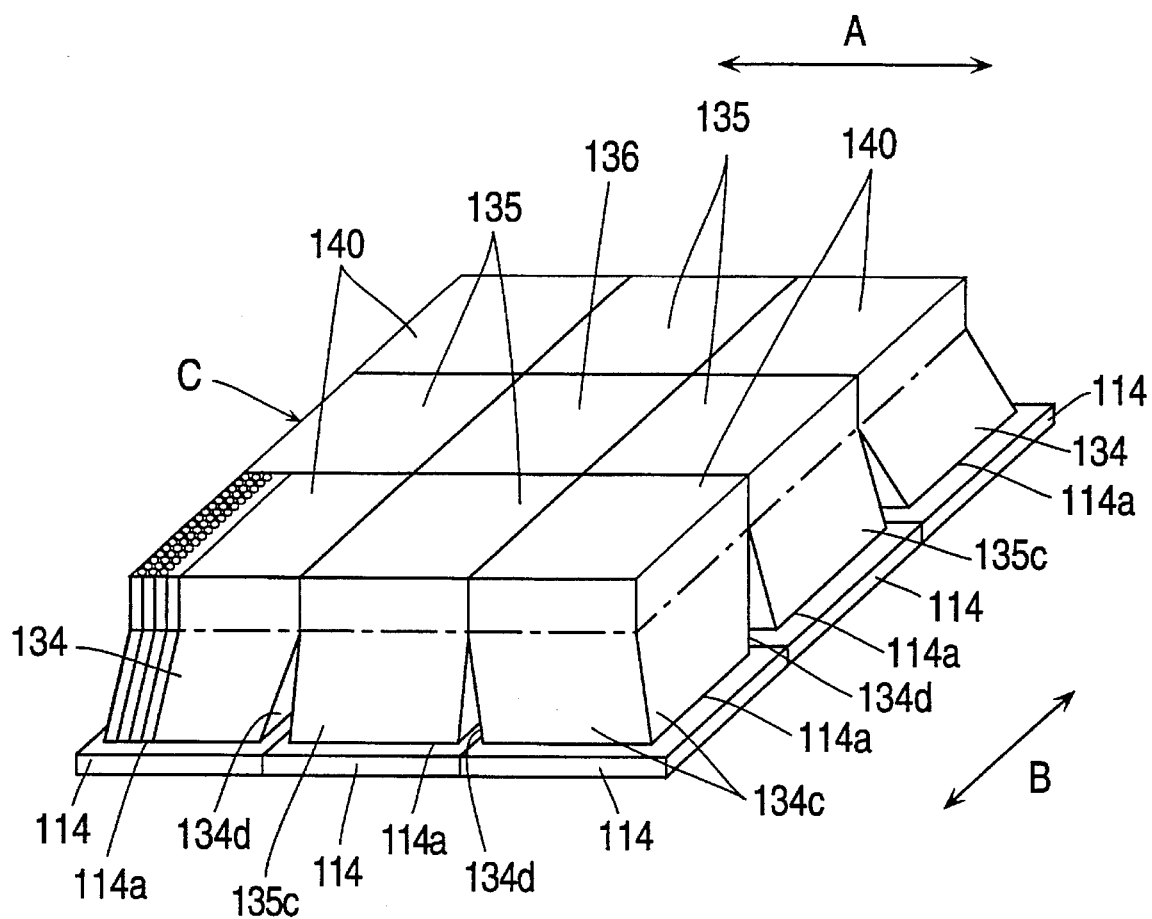
FIG. 15 is a perspective view showing a display apparatus to which the second example of the present invention is applied.

The number of display devices joined in one direction is not limited to two. Alternatively, a display apparatus may have a structure in which three display devices 114 are joined in each of the directions A and B, as is shown in FIG. 15. In this display apparatus, nine optical fiber bundles, i.e., four optical fiber bundles 134, four optical fiber bundles 135, and an optical fiber bundle 136 are joined to constitute an optical fiber bundle group 140. The emitting end face C of the optical fiber bundle group 140 serves as a flat display area having a size nine times as large as that of one of the display areas 114a. At the corners of the optical fiber bundle group 140, the four optical fiber bundles 134 which are bend in both the two directions A and B as described above are provided. The four optical fiber bundles 135 which are constituted by optical fiber sheets bent in one direction are interposed between the respective two optical fiber bundles 134. Each of the optical fiber bundle 135 has a pair of slopes (one is an outward facing slope 135c and the other is not shown) on the opposing side faces. At the center of the optical fiber bundle group 140, the optical fiber bundle 136 which is square without bending is provided. The optical fiber bundles having the outgoing slopes 134c, 135c, i.e., optical fiber bundles 134, 135 are disposed in such a manner that the outgoing slopes 134c, 135c are directed outward.

In the display apparatus having the above-mentioned structure, a display area having a size nine times as large as that of the display area 114a of one of the display device 114 without seams can be obtained.

EXAMPLE 3

Figure 1A:
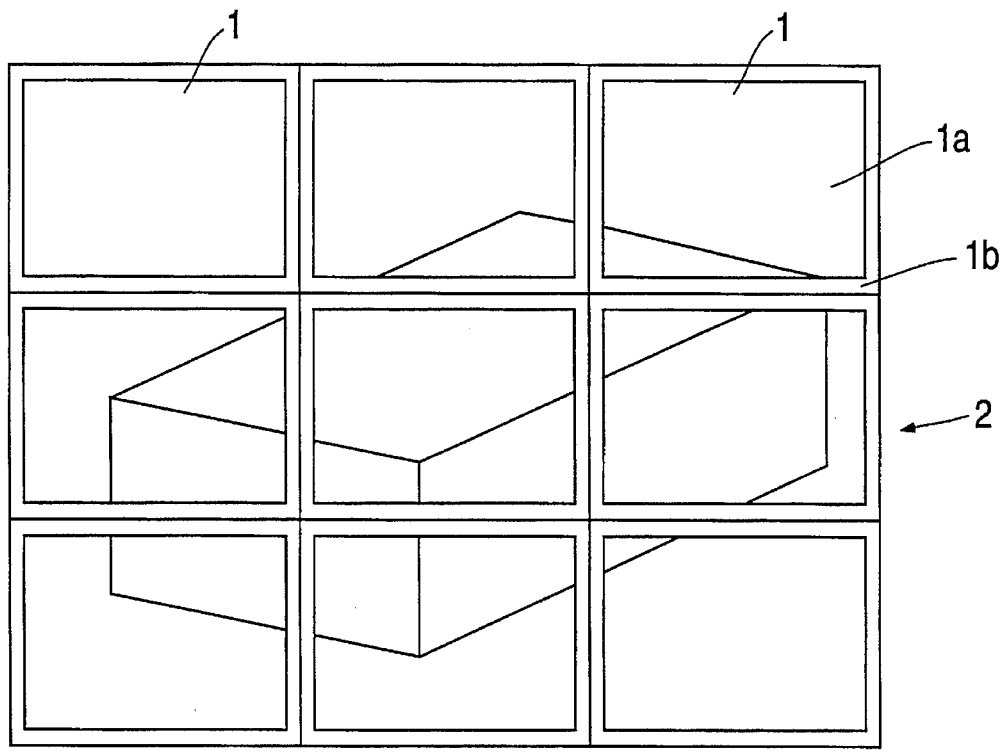
FIG. 1A is a plan view showing a conventional example in which a signal display apparatus is constituted by a plurality of display devices.
Figure 1B:
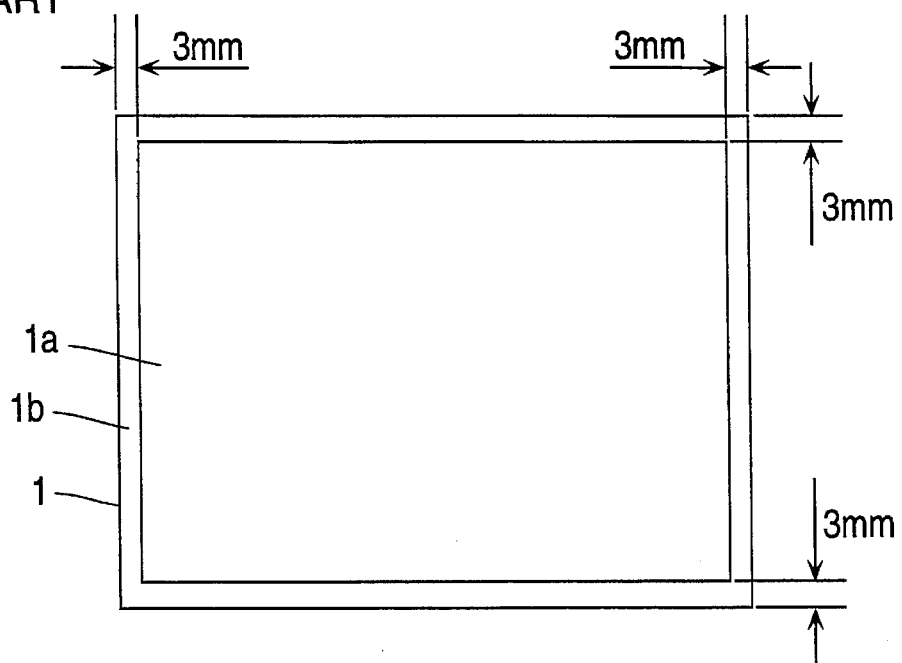
FIG. 1B is an enlarged view showing part of the display apparatus of FIG. 1A.
Figure 2:
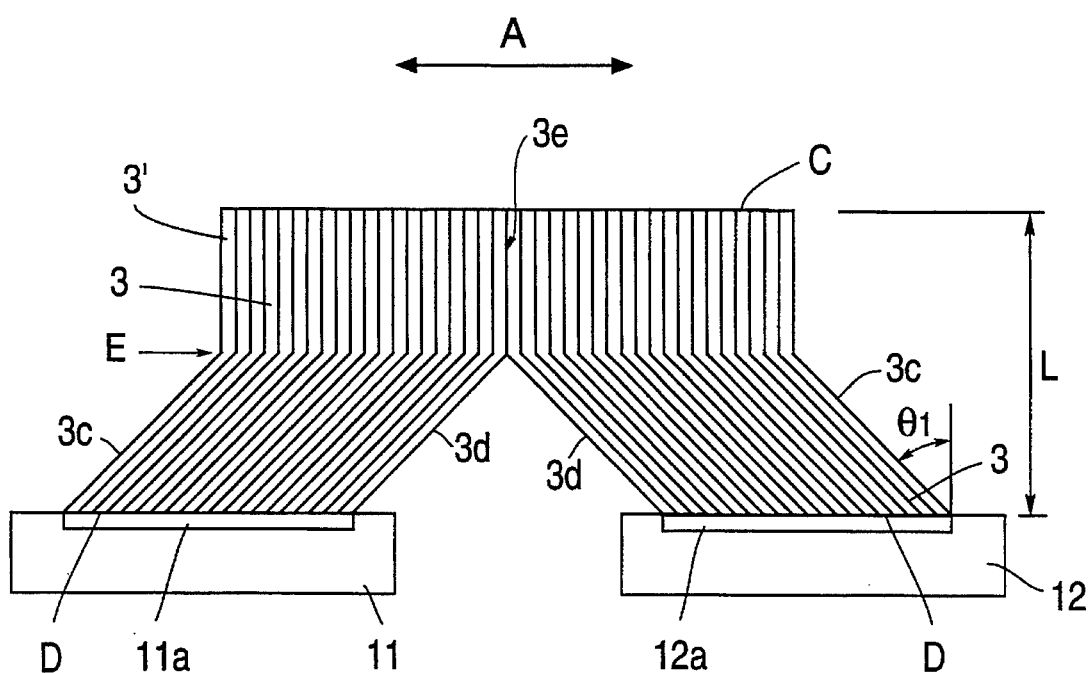
FIG. 2 is a front view showing a display apparatus in which an image without discontinuity can be obtained using two display devices.
Figure 3:
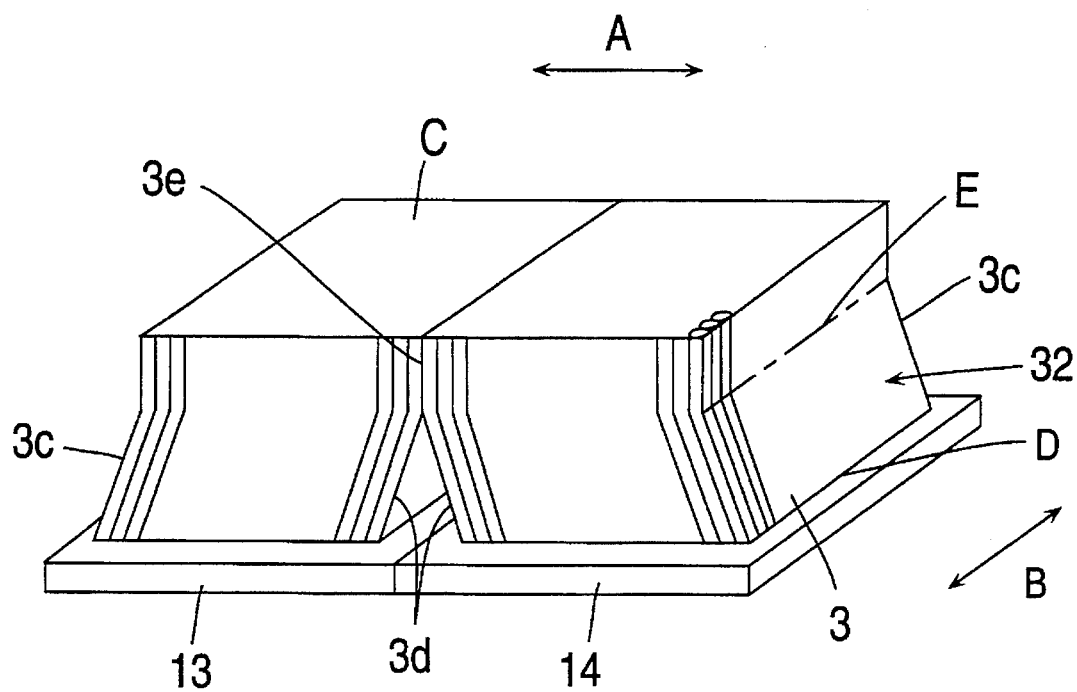
FIG. 3 is a perspective view showing another display apparatus in which an image without discontinuity can be obtained using two display devices.
Figure 4:
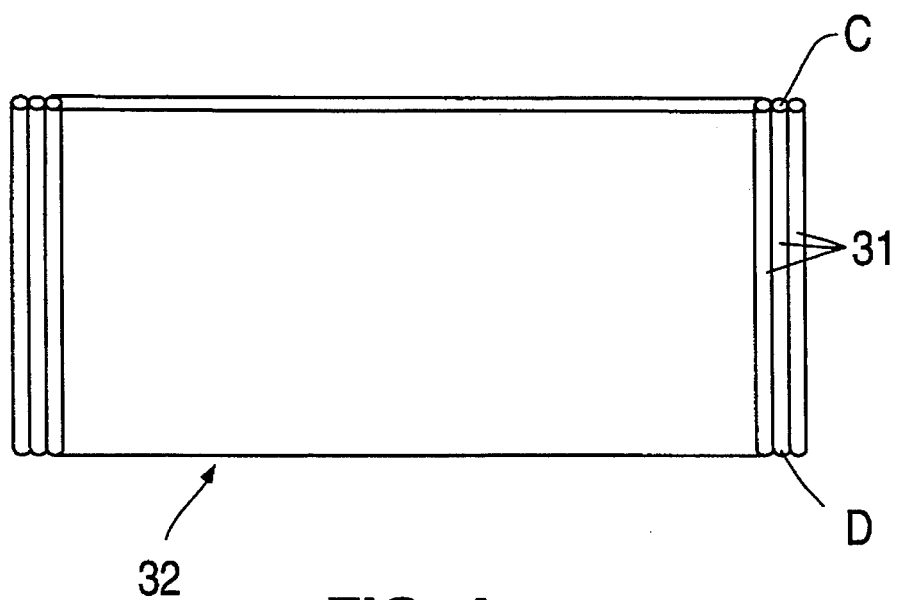
FIG. 4 is a side view of an optical fiber sheet.
Figure 5:
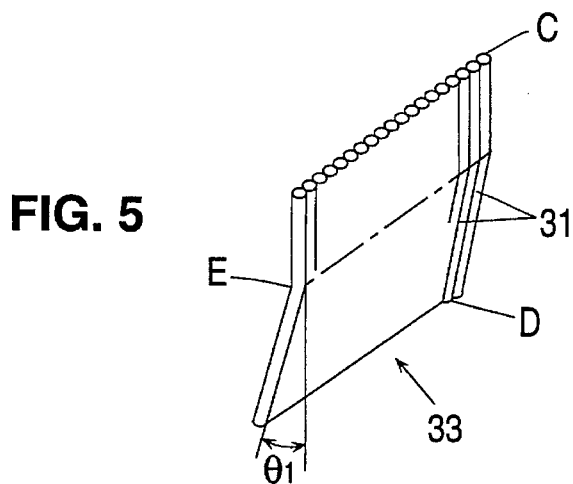
FIG. 5 is a perspective view of a bent optical fiber sheet.
Figure 6:
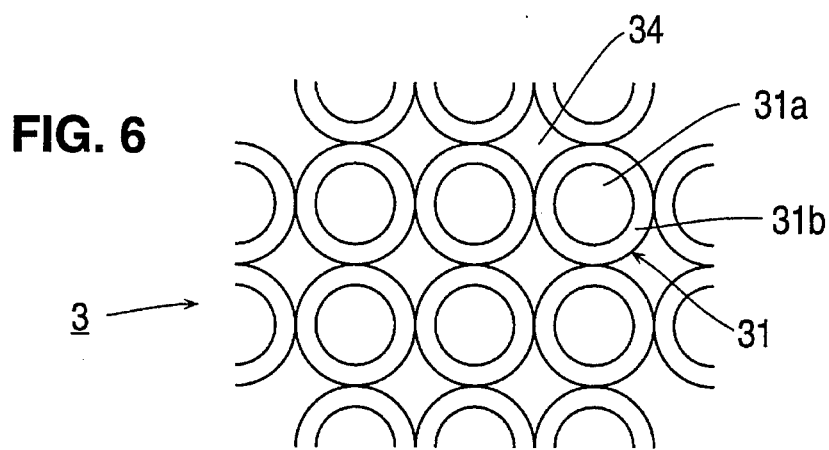
FIG. 6 is a sectional view of an optical fiber bundle.
Figure 7:
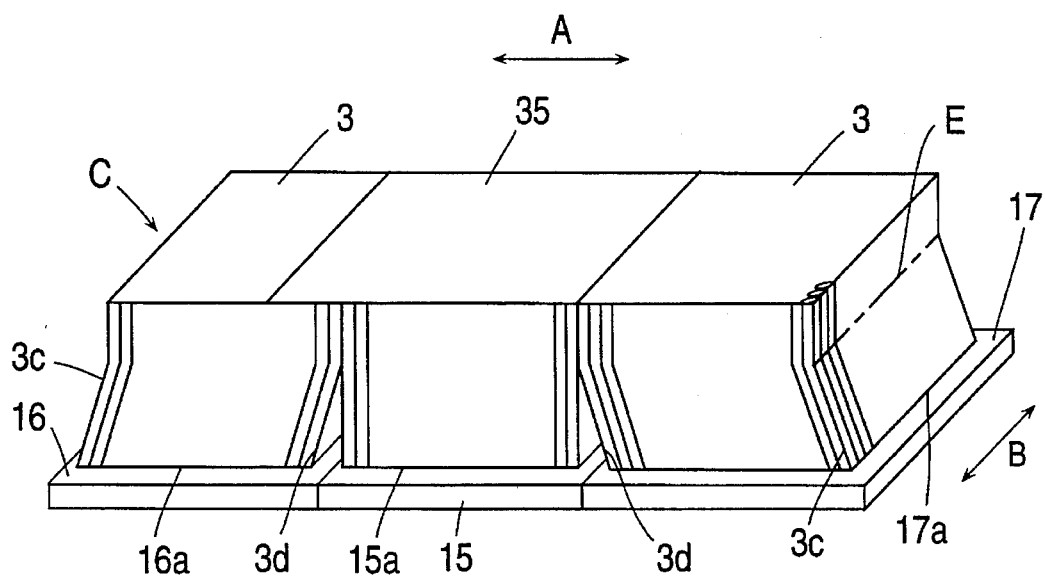
FIG. 7 is a perspective view showing a display apparatus in which an image without discontinuity can be obtained using three display devices.
Figure 16:
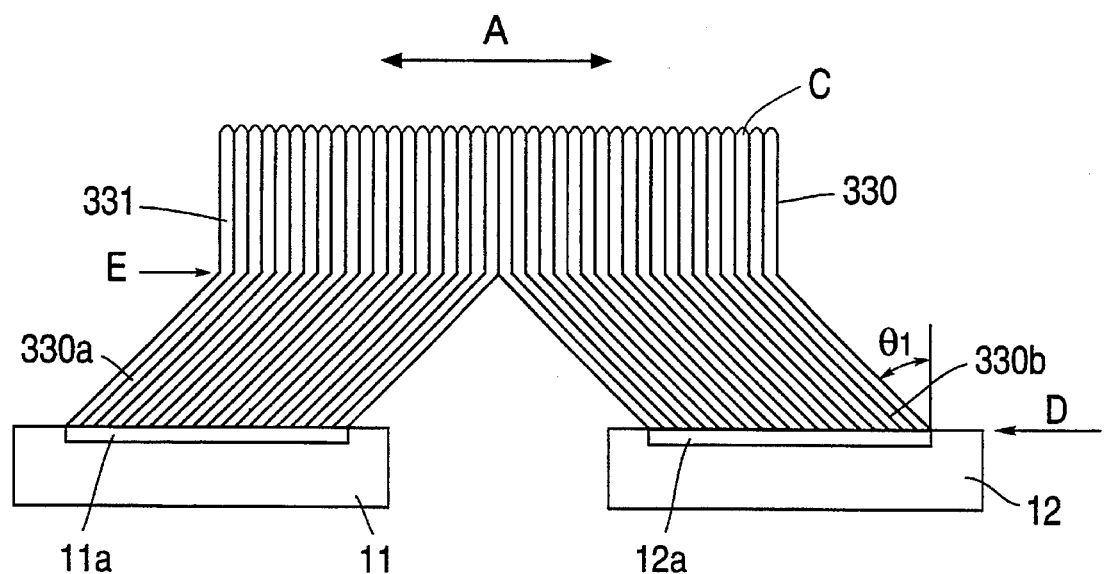
FIG. 16 is a front view showing a display apparatus according to a third example of the present invention.

FIG. 16 is a front view showing a display apparatus according to another example of the invention. This display device has the same structure of the conventional display device shown in FIG. 2 except for an optical fiber bundle 330. The same reference numerals are used for indicating members having the same structure as in the display device shown in FIG. 2.

Figure 17:
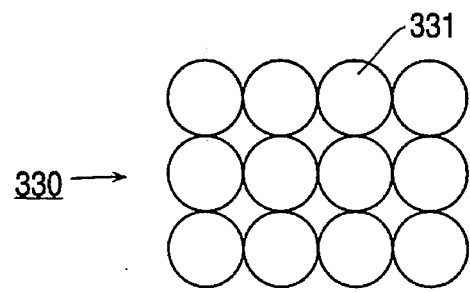
FIG. 17 is a sectional view showing an optical fiber bundle.

The display apparatus has two display devices 11 and 12. The display devices 11 and 12 are juxtaposed in such a manner that display areas 11a and 12a are directed to the same direction. To the display areas 11a and 12a as display input faces, the optical fiber bundle 330 for transmitting an image is connected on the side of one end face D. The optical fiber bundle 330 is obtained in the following way. A several number of optical fibers 331 are arranged side by side and bonded to each other, so as to form an optical fiber sheet. The optical fiber sheets are stacked into a shape of a block, which is the optical fiber bundle 330. FIG. 16 shows a state where the end one of the optical fibers 331 in each of the optical fiber sheets is seen. FIG. 17 shows the arranged state of the optical fibers 331 in the optical fiber bundle 330. The optical fiber bundle 330 on the side of the one end face D is separated into two branch portions 330a and 330b at a plane E so as to take the form of a reversed letter Y. One portion 330a on the side of one end face D is connected to the display area 11a in a state where the portion 330a is inclined to the display area 11a at an angle $\theta_1$ toward the display device 12. The other portions 330b of the optical fiber bundle 330 on the side of the one end face D is connected to the display area 12a in a state where the portion 330b is inclined to the display area 12a at the angle $\theta_1$ toward the display device 11.

The portions 330a and 330b of the optical fiber bundle 330 on the side of the one end face D are bent at the angle $\theta_1$ at the plane E so as to be combined. The combined portion on the side of the one end face C is directed to a direction perpendicular to the display areas 11a and 12a. At the end face C as an emitting end face of the optical fiber bundle 330, the optical fibers 331 are arranged at regular pitches and formed into a convex and concave shape (a waveform-like shape), so as to constitute a large display area. The emitting end face C is described below in detail.

The above two display devices 11 and 12 are driven through a driving circuit (not shown) by split signals. The split signals are obtained by splitting an image signal for each frame into two signals for right and left fields. Therefore, the images appearing on the display areas 11a and 12a are displayed as an image without discontinuity on the emitting end face C of the optical fiber bundle 330. Therefore, a large-sized composite display area with high quality can be formed.

Figure 18A:
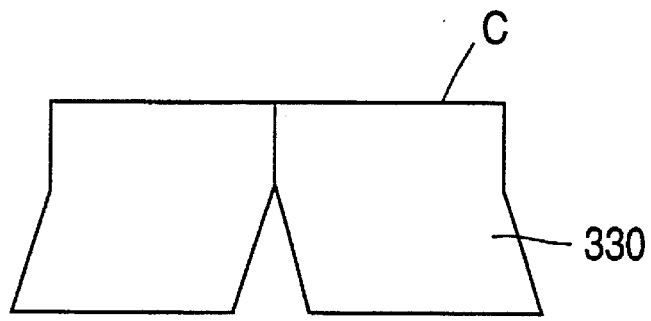
FIGS. 18A through 18C are views illustrating a process for forming a convex and concave form at an emitting end face C of an optical fiber bundle in the display apparatus shown in FIG. 16.
Figure 18B:
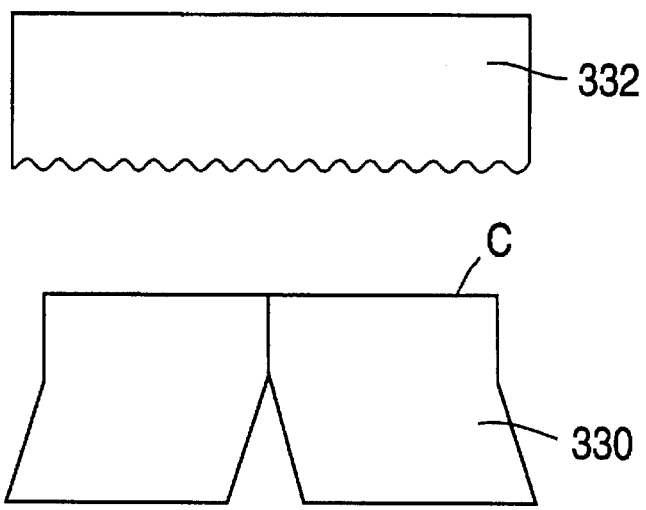
Figure 18C:
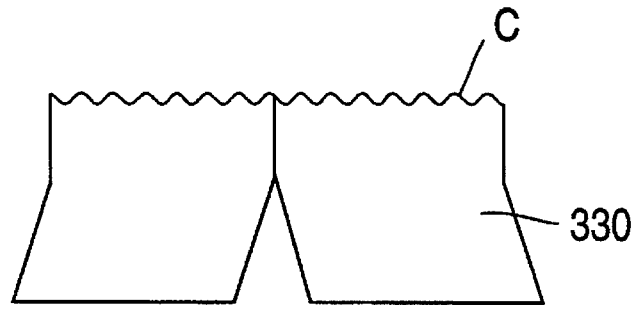

Now, the outline of a process for forming the convex and concave shape at the emitting end face C of the optical fiber bundle 330 is described with reference to FIGS. 18A through 18C. First, as is shown in FIG. 18A, the optical fiber bundle 330 having the same structure as that of the conventional optical fiber bundle is formed. Then, as is shown in FIG. 18B, a mold 332 having a convex and concave surface which is mirror-finished is pressed against the emitting end face C of the optical fiber bundle 330 while heating. As a result, the optical fiber sheets forming the optical fiber bundle 330 are bonded to each other and the emitting end face C of the optical fiber bundle 330 takes the convex and concave shape, as is shown in FIG. 18C. The convex and concave of the mold 332 are formed at the same pitches as those of the center axes of the adjacent optical fibers 331 in the optical fiber bundle 330. Accordingly, the emitting end face C of each of the optical fiber sheets constituting the optical fiber bundle 330 takes a shape that the center portion in a thickness direction of the optical fiber sheet (in a direction A in FIG. 16) is protrude, and the edge portions are recessed.

In this example, the pitches of the convex and concave are the same as those of the arranged pitches of the optical fibers 331, but alternatively, the pitches can be set to be smaller ones. Since the surface of the mold 332 is mirror-finished, the surface roughness of the convex and concave shape is very low. Therefore, it is possible to prevent the occurrence of light scattering on the end face C.

Figure 19A:
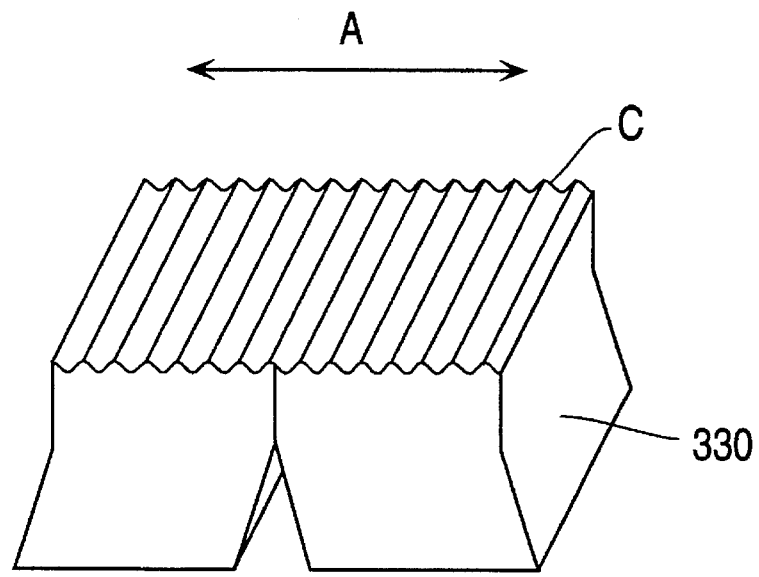
FIG. 19A is a perspective view showing an optical fiber bundle in the display apparatus shown in FIG. 16.
Figure 19B:
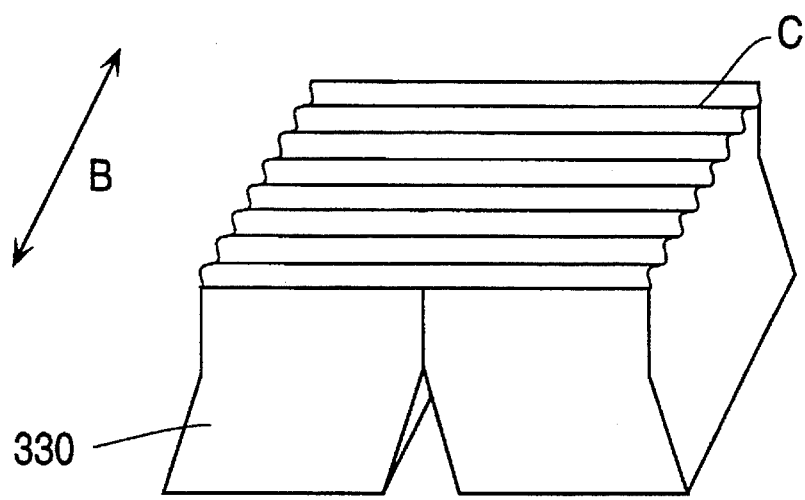
FIG. 19B is a perspective view showing a display apparatus to which the third example of the present invention is applied.

In the forming process shown in FIGS. 18A through 18C, the convex and concave of the end face C of the optical fiber bundle 330 are successively formed in a thickness direction of the optical fiber bundle 330, i.e., the direction A in which the optical fiber sheets are stacked, as is shown in FIG. 19A. In this case, the visual angle range is wide in the thickness direction A of the optical fiber bundle 330. In another case, as is shown in FIG. 19B, the convex and concave of the end face C are successively formed in a widthwise direction B of the optical fiber bundle 330. In this case, the visual angle range is wide in the widthwise direction B. In other words, the convex and concave of the end face C can by successively formed in a direction in which the visual angle range is desired to be wide. Alternatively, it is effective to successively form the convex and concave in two directions different from each other.

Figure 20A:
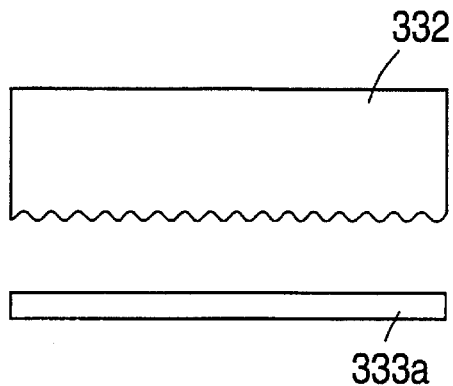
FIGS. 20A through 20D are plan views illustrating a method of producing the display apparatus shown in FIG. 19B.
Figure 20B:
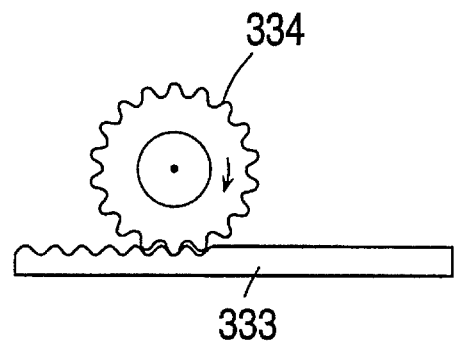
Figure 20C:
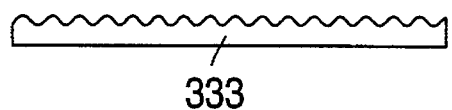
Figure 20D:
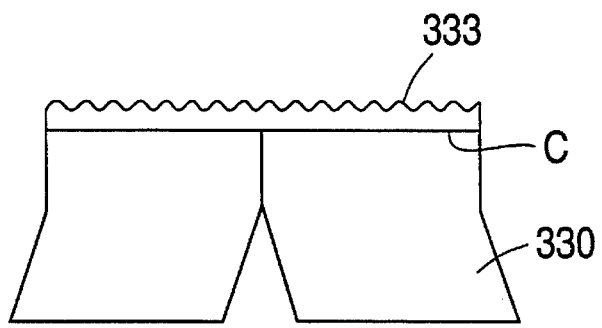

The viewing angle can be enlarged unless the fine convex and concave shape is not formed at the emitting end face C of the optical fiber bundle 330. For example, the viewing angle can be enlarged by methods shown in FIGS. 20A through 20D. First, as is shown in FIG. 20A, a transparent thin sheet 333a is pressed using the mold 332 while heating. To the surface of the pressed thin sheet 333a, the convex and concave shape is transferred, and a thin sheet 333 having a surface with convex and concave is obtained, as is shown in FIG. 20C. The thin sheet 333 with convex and concave is stuck on the end face C of the optical fiber bundle 330, as is shown in FIG. 20D. Alternatively, as is shown in FIG. 20B, a roller 334 having a surface with convex and concave may be used.

Figure 21:
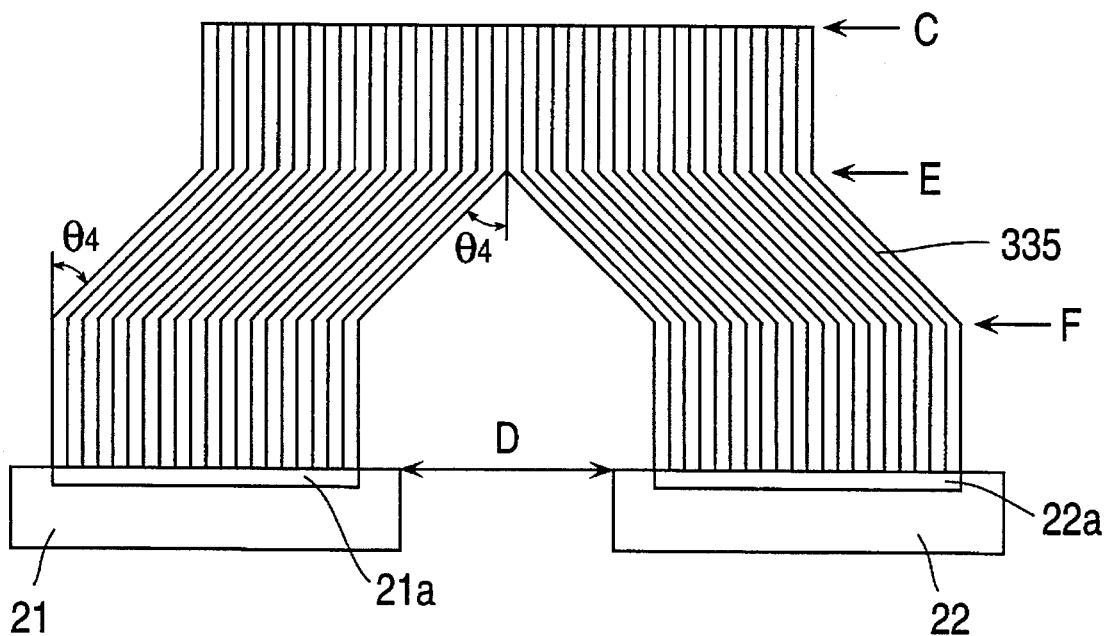
FIG. 21 is a front view showing a display apparatus to which the present invention can be applied.

The present invention is not limited to the above-described example, but can be applied to various types of display apparatus including an optical fiber bundle. In such a case, the emitting end face of the optical fiber bundle should be made into a convex and concave shape. For example, the invention can be applied to a display apparatus shown in FIG. 21. The display apparatus includes two display devices 21 and 22, and an optical fiber bundle 335. The display devices 21 and 22 have display areas 21a and 22a, respectively. The display areas 21a and 22a are connected to an introducing end face D of the optical fiber bundle 335. The optical fiber bundle 335 is bent at an angle $\theta_4$ at a plane E between the emitting end face C and the introducing end face D, and separated into two portions. The portions are then bent at the same angle $\theta_4$ at a plane F between the plane E and the introducing end face D in respective directions reversed to the bent directions at the plane E.

Figure 22:
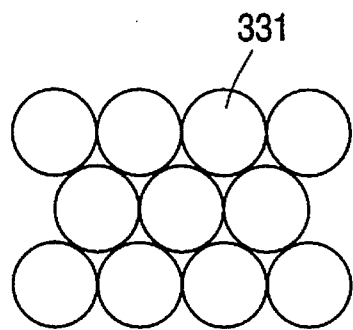
FIG. 22 is a sectional view showing an optical fiber bundle to which the present invention can be applied.

The present invention is not limited to the optical fiber bundle having optical fibers 331 are arranged vertically and horizontally, as is shown in FIG. 17. Alternatively, the present invention can be applied to an optical fiber bundle having optical fibers 331 arranged in an obliquely adjacent manner which is shown in FIG. 22, or to an optical fiber bundle in which a plurality of optical fibers only having core portions are bundled with an adhesive having a lower refractive index than that of the core portions.

EXAMPLE 4

This example is directed to a method of treating an end face of an optical fiber used in a display apparatus or the like for performing a large-area display by transmitting an image through an optical fiber bundle. FIGS. 23A through 23E are sectional view showing a process procedure for treating the end face of an optical fiber according to the invention.

Figure 23A:
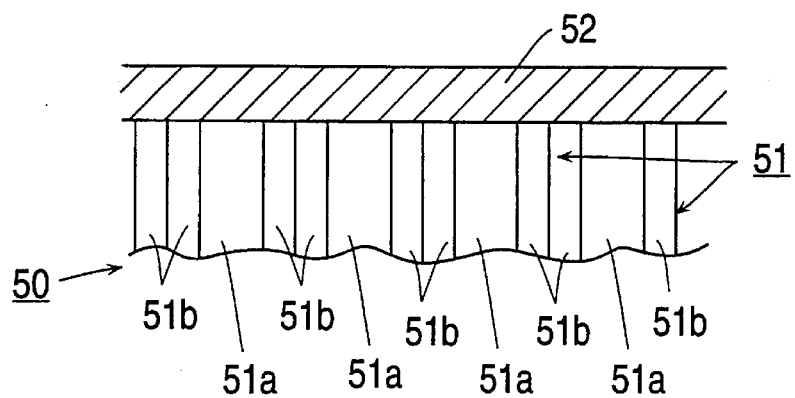
FIGS. 23A through 23E are views illustrating a method of treating the end of an optical fiber according a fourth example of the present invention.

First, as is shown in FIG. 23A, on one end face of an optical fiber bundle 50, a photosensitive resin 52 such as an optically dimerization type resin mainly including polyvinyl cinnamate is applied. The optical fiber bundle 50 is obtained by fastening a plurality of optical fibers 51 side by side. Each of the optical fibers 51 has a core portion 51a and a clad portion 51b.

Figure 23B:
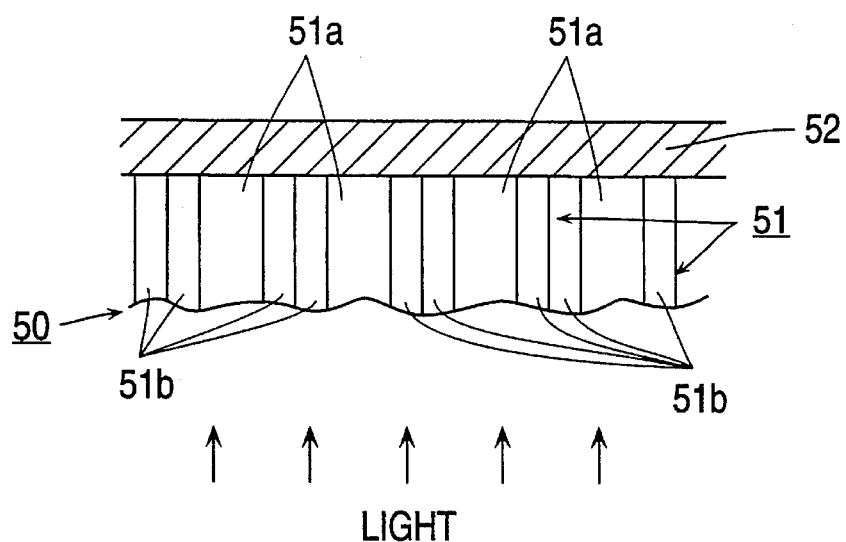
Figure 23C:
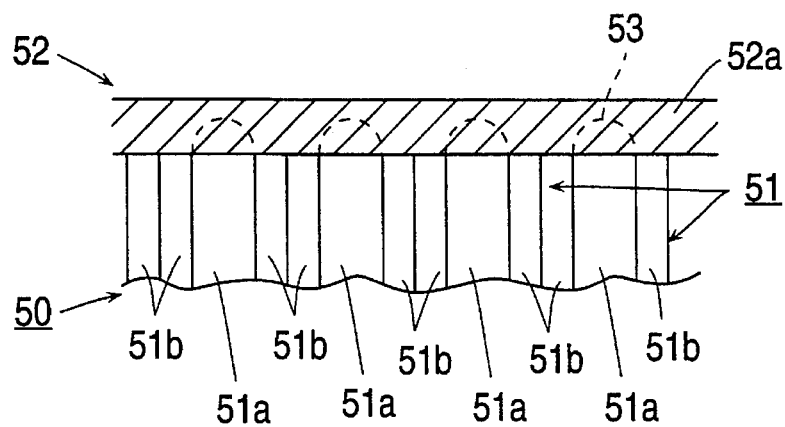

Then, as is shown in FIG. 23B, the other end face of the optical fiber bundle 50 on which the photosensitive resin 52 is not applied is irradiated with light for exposure. The exposure light passes through the core portion 51a and goes out from the end face on which the photosensitive resin 52 is applied. The emitted light has a certain intensity distribution. As a result, as is shown in FIG. 23C, only part of the photosensitive resin 52 which is applied on the core portions 51a is exposed and partially cured, so as to form cure portions 53. On the other hand, since the clad portions 51b does not transmit light therethrough, part of the photosensitive resin 52 on the clad portions 51b is not exposed to light so as to be an uncured portion 52a.

Figure 23D:
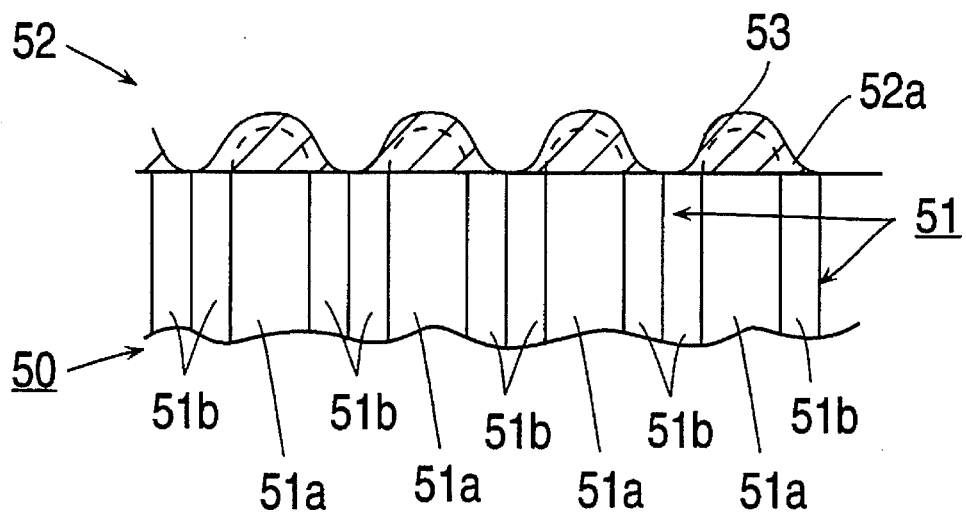

Then, the partially cured photosensitive resin 52 is developed using a developer such as trichlene, so as to remove the uncured portion 52a which is not exposed. At this step, the boundary between the cure portion 53 and the uncured portion 52a is not clearly defined, so that part of the uncured portion 52a around the cure portion 53 is not completely removed, as is shown in FIG. 23D. Therefore, the photosensitive resin 52 is developed to take a shape of successive lenses having gentle curves.

Figure 23E:
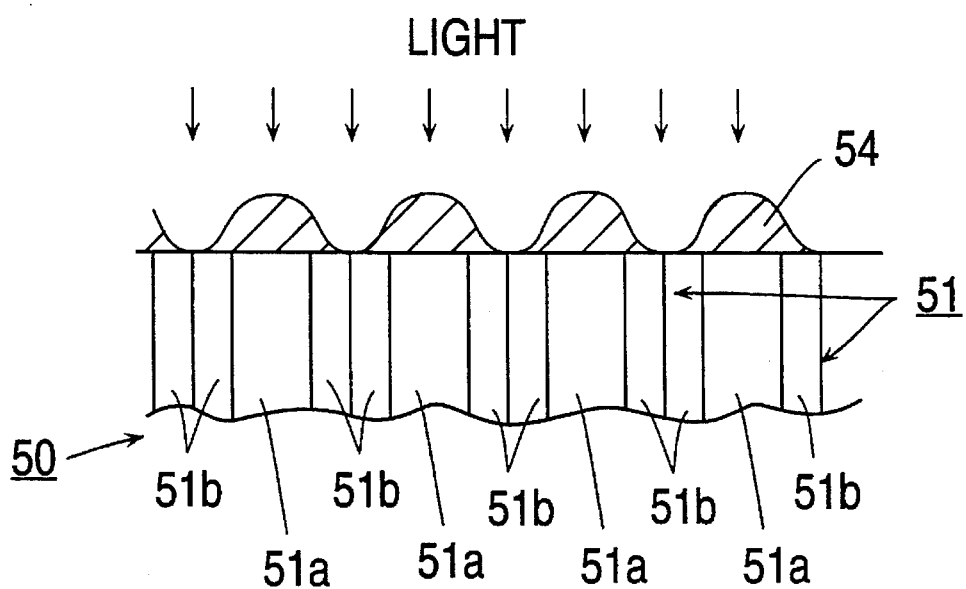

Finally, as is shown in FIG. 23E, the optical fiber bundle 50 is exposed to light on the end face side on which the photosensitive resin 52 is applied, so as to completely cure the remaining uncured portion 52a. Thus, a lens array 54 is obtained.

Figure 24:
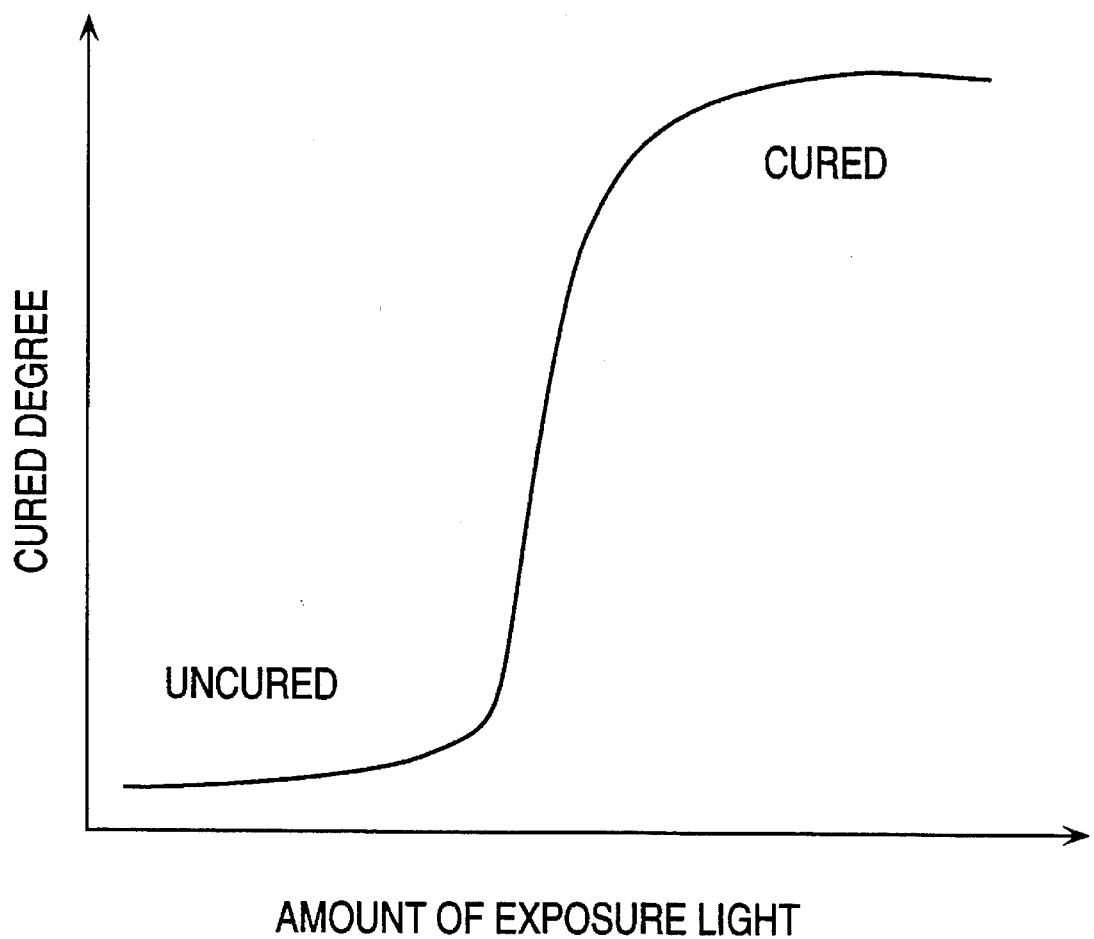
FIG. 24 is a graph showing a relationship between the amount of exposure light and the degree of cure of a photosensitive resin used in the fourth example.

FIG. 24 shows a relationship between the amount of exposure light and the cured degree of the photosensitive resin 52 used in this example. It is seen from FIG. 24 that the cure of the photosensitive resin 52 is suddenly progressed after reaching a certain amount of exposure light. Accordingly, a difference between the cure portion 53 and the uncured portion 52a is clearly observed, so that this method is suitable for forming the lens-like shape.

The lens array 54 formed on the end face of the optical fiber bundle 50 by the above method has a successively curved surface and is formed integrally with the optical fiber bundle 50. Accordingly, even if the arrangement of the optical fibers 51 in the optical fiber bundle 50 is irregular, the lens array 54 can be readily be applied. As a result, it is unnecessary to measure the pitches of the arranged optical fibers 51 and to form a mask for the formation of the lens array, and a process step for connecting the optical fiber bundle 50 with the lens array is not required, whereby the production cost can be reduced. Moreover, it is unnecessary to align the optical fibers 51 with the lens array, as in the prior art method.

EXAMPLE 5

This example relates to a structure of optical fiber bundle used in a display apparatus which performs a large-area display by transmitting an image through the optical fiber bundle.

Figure 25:
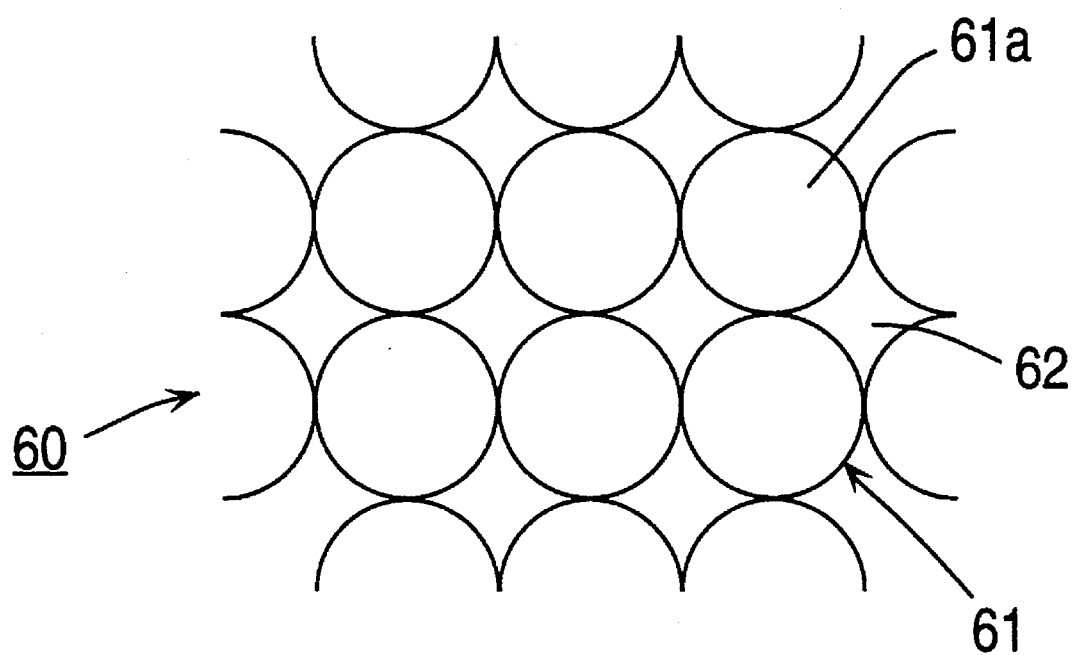
FIG. 25 is a sectional view showing an optical fiber bundle according to a fifth example of the present invention.

FIG. 25 is a sectional view showing an optical fiber bundle 60 according to the invention. The optical fiber bundle 60 is obtained by the following manner. A several number of optical fibers 61 are arranged side by side and bonded to each other, so as to form an optical fiber sheet. The optical fiber sheets are stacked to take a shape of a block. Each of the optical fibers 61 has only a core portion 61a. In the optical fiber bundle 60, the adjacent optical fibers 61 are in contact with each other. A gap between the adjacent optical fibers 61 is filled with an adhesive 62 having a refractive index slightly lower than that of the core portion 61a, so that the optical fibers 61 are fixed to each other. The value of the refractive index of a material as the adhesive 62 is preferably lower than that of the core portion 61a by a value of 0.1 to 0.01. Specifically, when the core portion 61a is formed, for example, of a polyurethane plastic, polymethyl methacrylate (PMMA) or the like is suitably used as the material of the adhesive 62.

As described above, the optical fiber bundle 60 is formed by optical fibers 61 having only core portions 61a and the adhesive 62 having a lower refractive index than that of the core portions 61a. Thus, the adhesive 62 can serve as a conventional clad portion. Therefore, the optical fiber bundle 60 does not necessitate the clad portion, so that the occupied ratio of the core portions 61a can be increased. The occupied ratio of the core portions 61a in the optical fiber bundle 60 is represented by an occupied area by the core portions 61a per a unit area in the cross section, and is referred to as a filling factor. In a conventional case of an optical fiber having the outer diameter of 250 µm and the core diameter of 240 µm, the filling factor is 72.4%. In this example in which the outer diameter of the optical fiber 61 is 250 µm, the filling factor is 78.5%, which is higher than in the conventional case.

The present invention is not limited to this example, but alternatively, the optical fiber bundle 60 having the above structure can be applied to various types of display apparatus, for example, to an optical fiber bundle having optical fibers 331 arranged in an obliquely adjacent manner, as is shown in FIG. 22.

EXAMPLE 6

This example relates to a method of fabricating an optical fiber bundle employed in a display apparatus or the like in which a large-area display is performed by transmitting an image through the optical fiber bundle. FIGS. 26A through 26F are sectional views showing respective process steps of the method of fabricating the optical fiber bundle according to this example.

Figure 26A:
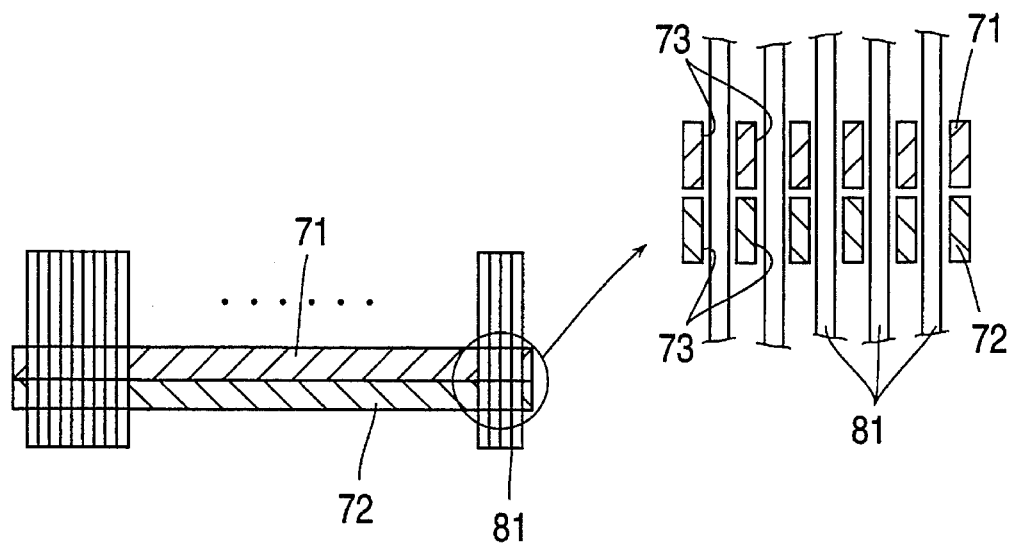
FIGS. 26A through 26F are views illustrating a method of fabricating an optical fiber bundle according to a sixth example of the present invention.
Figure 26B:
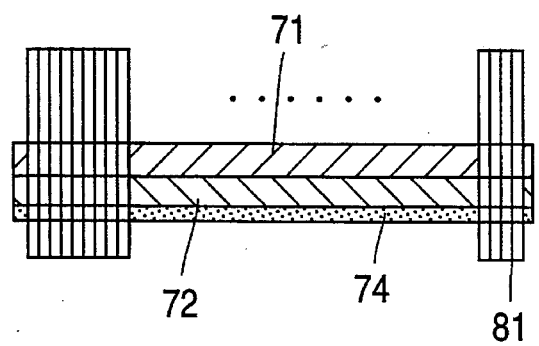
Figure 26C:
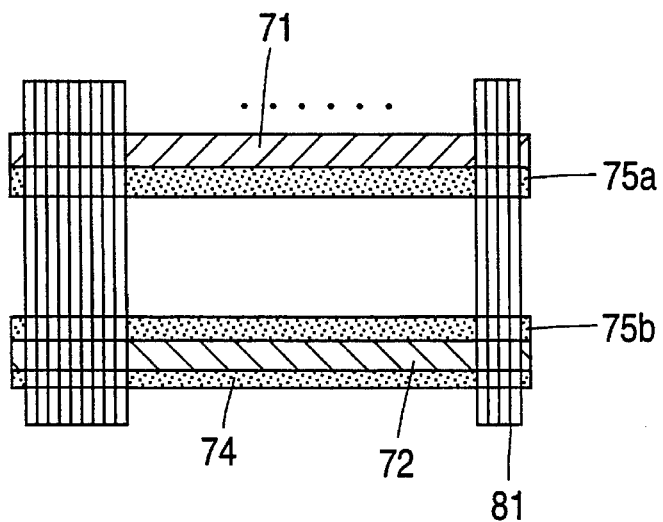

First, an upper guide plate 71 is superimposed on a lower guide plate 72. A plurality of holes 73 are formed at the same and regular pitches in both of the upper guide plate 71 and the lower guide plate 72. As is shown in FIG. 26A, optical fibers 81 are put through the holes 73. Then, in order to maintain the perpendicular relationship between the upper and lower guide plates 71 and 72 and the optical fibers 81, as is shown in FIG. 26B, a wax 74 is applied to the lower face of the lower guide plate 72. Then, the upper guide plate 71 is upwardly moved by 20–50 mm. In this state, in order to fix the optical fibers 81 to each other, adhesives 75a and 75b are applied to the lower surface of the upper guide plate 71 and the upper surface of the lower guide plate 72, as is shown in FIG. 26C after an release agent (not shown) is applied to the lower surface of the upper guide plate 71 and the upper surface of the lower guide plate 72.

Figure 26D:
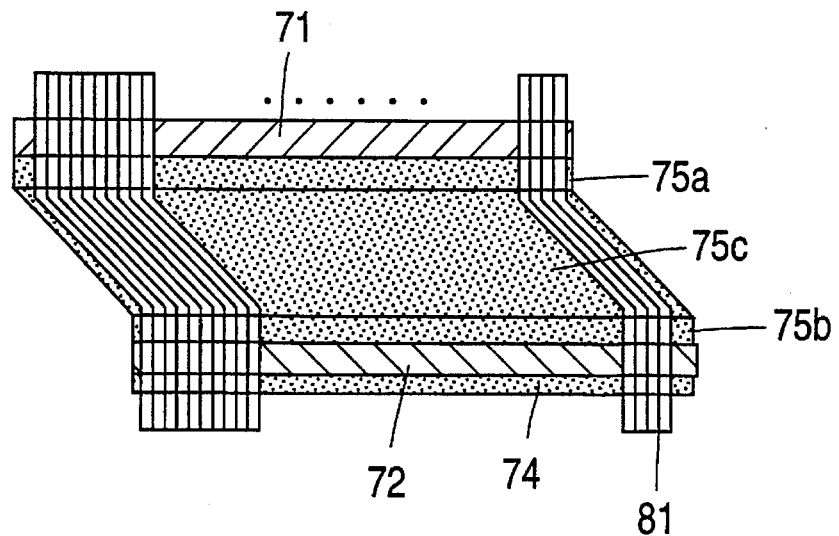
Figure 26E:
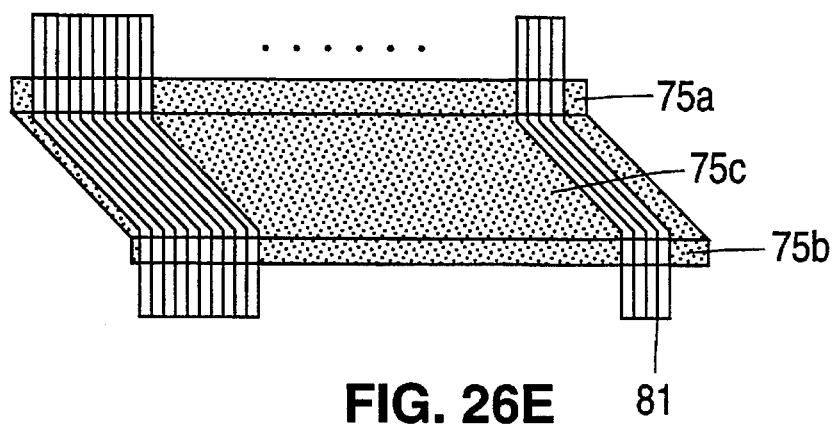
Figure 26F:
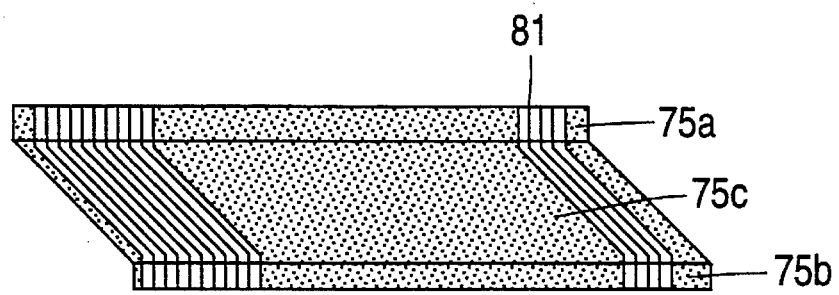

Next, the upper guide plate 71 is shifted in a desired direction with respect to the lower guide plate 72, so that the optical fibers 81 are bent at a desired angle. The optical fibers 81 between the upper guide plate 71 and the lower guide plate 72 are fixed to each other with an adhesive 75c, as is shown in FIG. 26D. Thereafter, as is shown in FIG. 26E, the wax 74 is dissolved by a solvent, and the upper and the lower guide plates 71 and 72 are removed. At last, as is shown in FIG. 26F, the surface is finished by cutting the adhesives 75a and 75b slightly.

According to the fabricating method, when the optical fibers 81 are bent, the optical fibers 81 are fixed by the holes 73 formed at regular pitches in the upper and the lower guide plates 71 and 72. As a result, the optical fiber bundle which is an integer of the optical fibers 81 has a regular arrangement. The bending angle applied to the optical fiber bundle can readily be controlled by adjusting the shift width of the upper guide plate 71 in a desired direction with respect to the lower guide plate 72.

If the employed optical fibers 81 have only core portions, the structure of the optical fiber bundle can be the same as in the fifth example. In this case, the adhesive 75c serves as the clad portion for the optical fibers 81, so that the light transmissivity can be improved.

EXAMPLE 7

Figure 27:
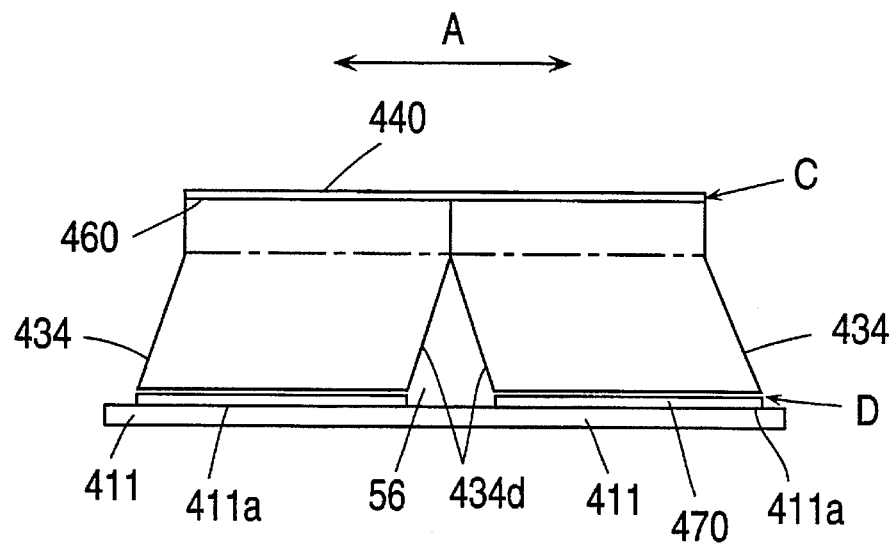
FIG. 27 is a front view showing a display apparatus according to a seventh example of the present invention.
Figure 28:
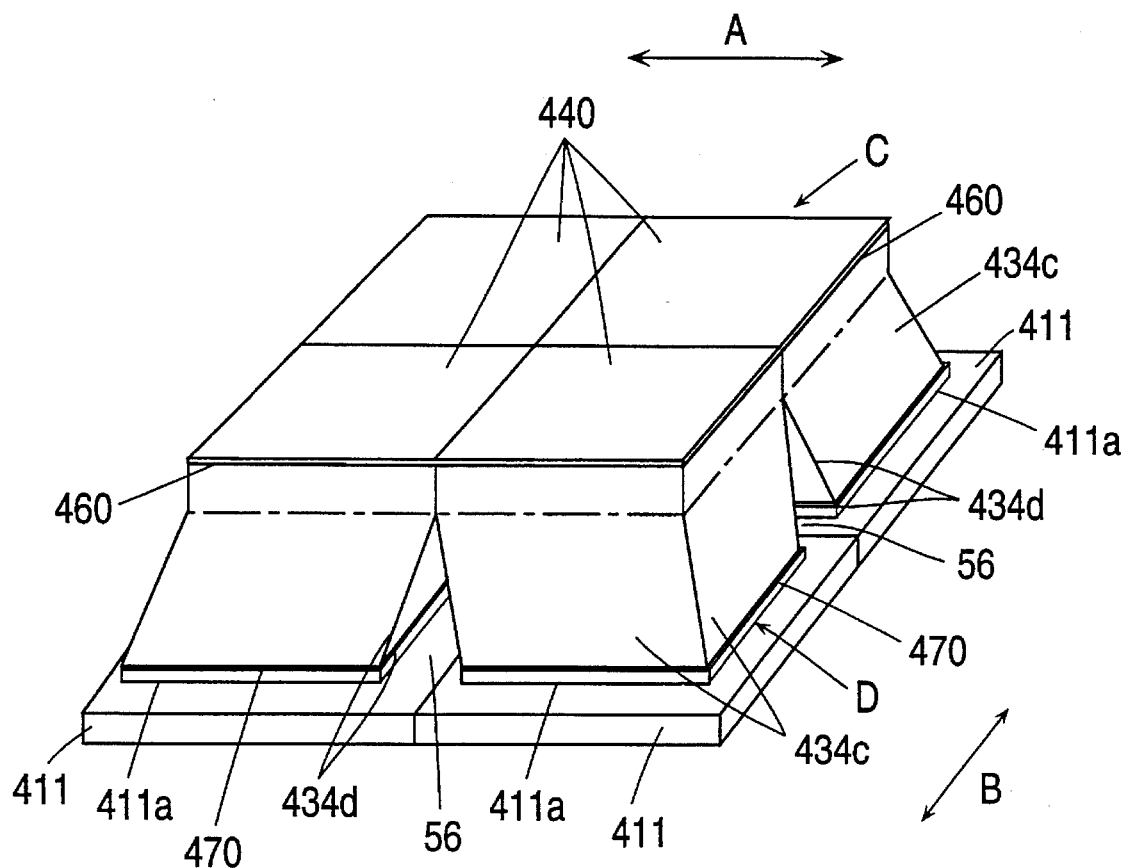
FIG. 28 is a perspective view showing a display apparatus shown in FIG. 27.

FIGS. 27 and 28 show a display apparatus according to another example of the present invention. FIG. 27 is a front view and FIG. 28 is a perspective view. The display apparatus includes two display devices 411 juxtaposed in a direction A and two display devices 411 juxtaposed in a direction B, i.e., total four display devices 411, and an optical fiber bundle group 440 connected to the display devices 411 via a film for preventing moisture permeation (not shown; hereinafter, referred to as an "anti-moisture permeation film"). Each of the display devices 411 has a display area 411a. The optical fiber group 440 is constituted by four optical fiber bundles 434. A sealing member 470 is formed so as to cover the portion where the display areas 411a are coupled to the optical fiber bundles 434. Each of the optical fiber bundle 434 has two outgoing slopes 434c on adjacent side faces. Four optical fiber bundles 434 are connected by side faces 434e in such a manner that the outgoing slopes 434c are directed to the outside. On an emitting end face C of the optical fiber bundle group 440, an anti-moisture permeation film 460 is formed. The anti-moisture permeation film formed between the display areas 411a and the optical fiber bundles 434 and the anti-moisture permeation film 460 on the emitting end face C are made, for example, from a coating agent such as a synthetic resin of vinylidene chloride system or a film having an anti-moisture permeation effect. Thus, the emitting end face C of the optical fiber bundle group 440 constituted by the four display devices 411 is made to form a plane, whereby a composite display area can be formed.

The optical fiber bundle 434 has the same structure as that of the optical fiber bundle 134 of the display apparatus shown in FIG. 11. That is, the optical fiber bundle 434 is constituted by a plurality of optical fibers which are cut to have a prescribed length. The core portion of the optical fiber is formed of acrylic.

The anti-moisture permeation film provided between the display areas 411a and the optical fiber bundles 434, and the anti-moisture permeation film on the emitting end face C can be formed by the following various methods.

Figure 29A:
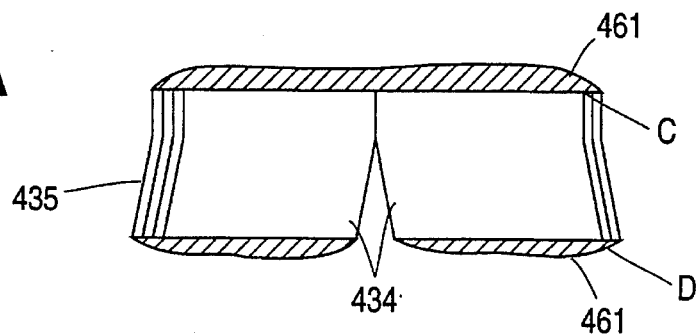
FIGS. 29A through 29E are views illustrating an exemplary method of forming an anti-moisture permeation film in the display apparatus shown in FIGS. 27 and 28.
Figure 29B:
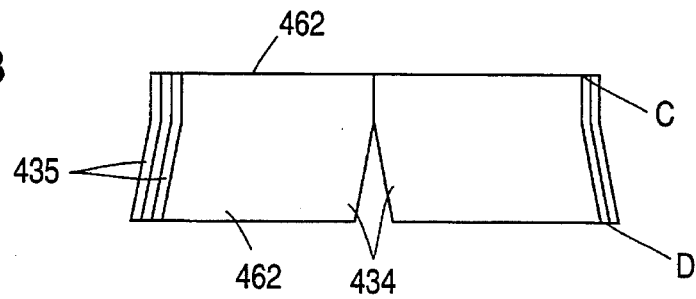
Figure 29C:
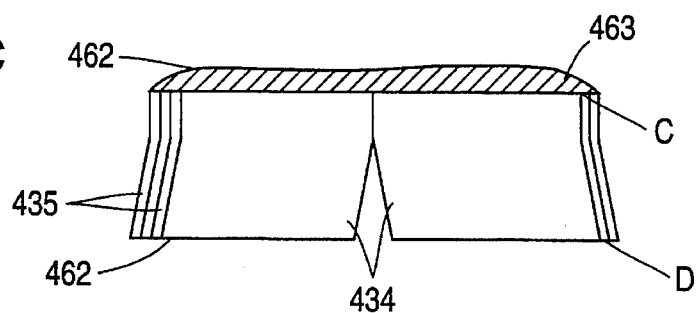
Figure 29D:
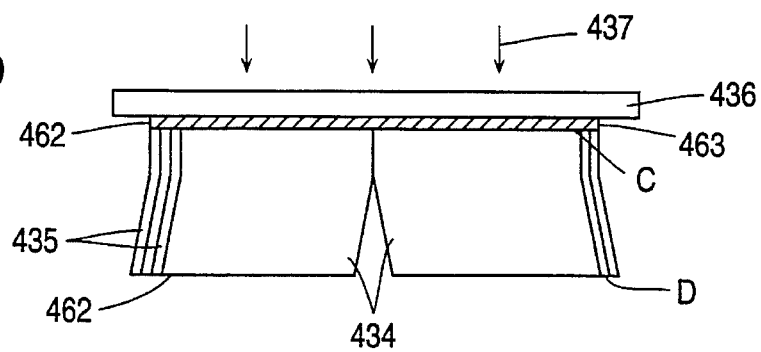
Figure 29E:
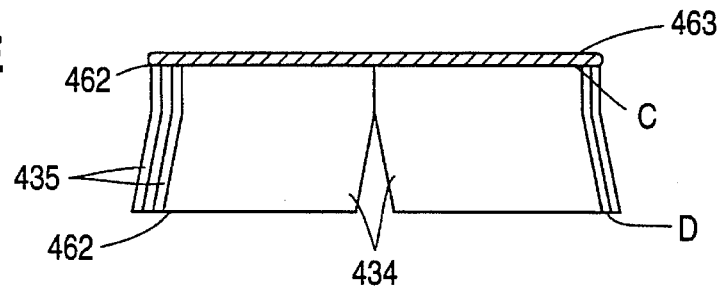

A first method is described with reference to FIGS. 29A through 29E. First, as is shown in FIG. 29A, gaps between adjacent optical fibers 435 in the vicinity of both end faces C and D of an optical fiber bundle 434 are sufficiently filled with an adhesive resin 461 of a certain thickness having an anti-moisture permeation effect. The resin 461 is, for example, a transparent epoxy resin. At this time, as required, the end faces C and D of the optical fiber bundle 434 are cut so that they are made even. Then, as is shown in FIG. 29B, after the resin 461 is sufficiently cured, the cured resin 461 is cut, so as to form a very thin transparent resin layer 462 on each of the end faces C and D. In a case where the end face of the optical fiber bundle 434 is directly cut, since the end face C or D thereof includes different materials having different cut resistances such as acrylic (the optical fibers), an epoxy resin (the filling adhesive member), and polyester or the like (the spacers), the cutting edge of a cutter is vibrated due to the different cut resistances, whereby it is difficult to obtain a good worked surface. On the other hand, in this first method, since a cut resistance does not fluctuate, a good worked surface can be obtained. Thereafter, as is shown in FIG. 29C, on the transparent resin layer 462 formed on the emitting end face C, a photosensitive polymer (hereinafter, referred to as a 2P resin) 463 is applied. As the 2P resin 463, for example, a 2P resin available from HOYA Inc. (refractive index: 1.52, saturated water absorption: 0.68%) is adopted. Regarding the saturated water absorption, the saturated water absorption of the 2P resin 463 is one-third of that of PMMA (saturated water absorption: 2.2%) as a material of the core portion of each optical fiber 435, which is preferable. A lower saturated water absorption of the 2P resin is more preferable. Next, as is shown in FIG. 29D, the upper surface of the 2P resin 463 is pressed using a transparent substrate 436 on which a mold release agent is applied, so as to make the surface of the 2P resin 463 flat. Thus, the thickness of the 2P resin 463 is adjusted. Since the 2P resin 463 can transfer the flatness of the surface of the transparent substrate 436, it is not necessary to finish the surface of the 2P resin 463 to be a mirror face after removing the transparent substrate 436. Then, ultraviolet light 437 is projected onto the emitting end face C from the outside of the transparent substrate 436, so as to cure the 2P resin 463. Finally, as is shown in FIG. 29E, the transparent substrate 436 is removed, so that the anti-moisture permeation film 460 which initially has a mirror surface is obtained. At the end face D, the very thin transparent resin layer 462 is finished to be a mirror face.

Figure 30A:
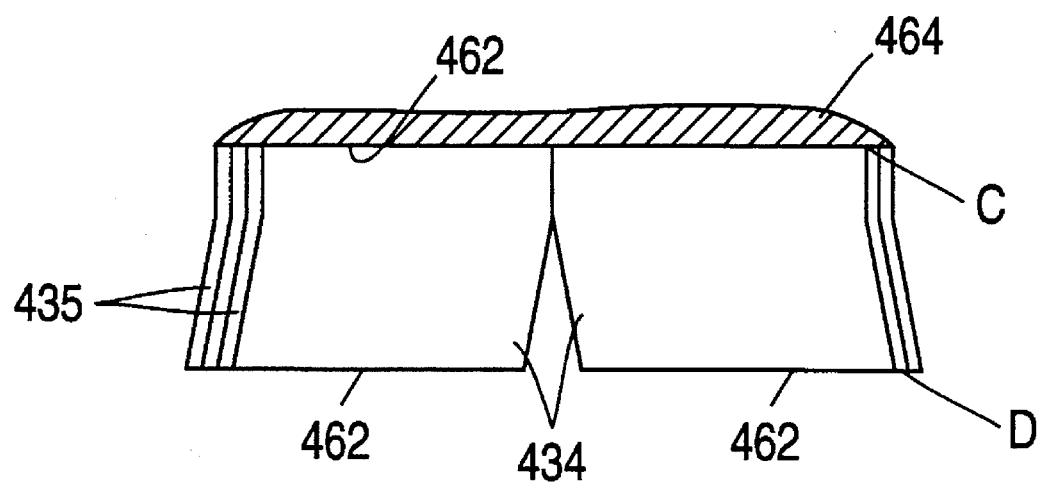
FIGS. 30A and 30B are views illustrating another method of forming an anti-moisture permeation film in the display apparatus shown in FIGS. 27 and 28.
Figure 30B:
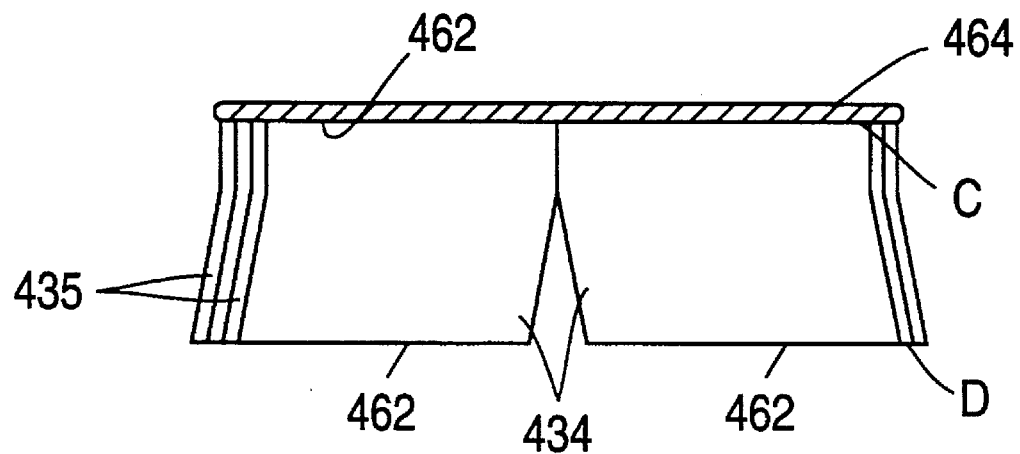

A second method is described with reference to FIGS. 29A, 29B, 30A and 30B. First, as is shown in FIG. 29A, gaps between the adjacent optical fibers 435 in the vicinity of the end faces C and D of the optical fiber 434 are sufficiently filled with an adhesive resin 461 of a certain thickness having the anti-moisture permeation effect. The resin 461 is, for example, a transparent epoxy resin. Also, in the second method, as required, the end faces C and D of the optical fiber bundle 435 are cut. Then, as is shown in FIG. 29B, after the resin 461 is cured, the resin 461 is cut to form a very thin resin layer 462. Then, as is shown in FIG. 30A, the transparent resin layer 462 formed on the emitting end face C is coated with a resin 464 (e.g., a transparent epoxy resin) having the anti-moisture permeation effect. After the transparent resin 464 is cured, the end face C is cut and finished to be a mirror face, as is shown in FIG. 30B. At the end face D, the transparent resin layer 462 which has been cut is finished to be a mirror face.

In the first and second methods, when the optical fiber bundle 434 has a structure using the spacers 64 shown in FIG. 10, only the spacers 64 are black, and a transparent resin is used for filling the gaps between the optical fibers 130 and the spacers 64. The transparent resin is, for example, an epoxy resin 2023 (saturated water absorption: 0.65%) available from THREE BOND Inc.

In a third method, first, both the emitting end face C and the introducing end face D of the optical fiber bundle 434 are cut, and then 2P resins are applied on both the end faces C and D. Then, each of the outer surface of the 2P resin is pressed using a transparent substrate on which a mold release agent is applied, so as to make the surface of the 2P resin into a plane, whereby the thickness of the 2P resin is adjusted. Thereafter, ultraviolet light is projected onto both the end faces C and D from the outside of the transparent substrate, so as to cure the 2P resins. Finally, the transparent substrates are removed, so that the anti-moisture permeation films 460 initially having mirror surfaces are obtained on both the end faces C and D. As the 2P resin, for example, the above-mentioned 2P resin available from HOYA Inc. is preferably used.

In a fourth method, first both the emitting end face C and the introducing end face D of the optical fiber bundle 434 are cut, and then both the end faces C and D are coated with an epoxy resin. Next, after the epoxy resin is cured, both the end faces C and D are cut again so as to be mirror faces. In this case, since a cut resistance does not fluctuate, a good worked surface can be obtained, as in the above-described methods.

In a fifth method, anti-moisture permeation films formed on the end faces C and D of the optical fiber bundle 434 by any one of the above four methods are coated with a resin of vinylidene chloride system. As the resin of vinylidene chloride, for example, ASAHIKASEI saranlatex, KUREHA KAGAKU chretronlatex or the like is used. By this method, the ability for preventing the water absorption of the anti-moisture permeation film 460 or the like can be further improved.

As described above, in a display apparatus in which anti-moisture permeation films 460 or the like are formed on both the end faces C and D of the optical fiber bundle 434, even if the core portion of each optical fiber is made of acrylic, the core portion will not absorb the moisture in the air. As a result, the optical fiber is prevented from expanding and shrinking repeatedly due to the moisture absorption of acrylic from the air. Therefore, no crack occurs at the end faces of the optical fiber bundle group 440. This means that the disadvantageous factor of the image distortion or the like can be previously avoided. Moreover, if the surface of the anti-moisture permeation film 460 is finished to be a mirror, light scattering due to the unevenness of the emitting end face C can be prevented, whereby a vivid image can be provided.

In the display apparatus according to this example, the sealing member 470 is formed so as to cover the portion where the display areas 411a and the optical fiber bundles 434 are coupled. Because of this sealing member 470, small gaps are sealed, so that fine dirt or moisture is prevented from entering. Therefore, the occurrence of the above-mentioned faulty picture elements can be eliminated. As the sealing member 470, a usual sealing member may be used as far as the sealing member has a good sealing ability and the material thereof is difficult to change. If the sealing member 470 has elasticity after a long period, the sealing member 470 has a resistance against vibration or shock to some extent and continues to adhere, whereby gaps are not likely to occur. It is necessary to inject the sealing member 470 over the portion where the display areas 411a and the optical fiber bundles 434 are coupled, using a sealing member injecting nozzle or the like. It is desired that the sealing member injecting nozzle has a sufficiently tapered end and an appropriate length. Because a gap 56 formed by a facing pair of ingoing slopes 434d of the optical fiber bundles 434 is narrow.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display apparatus comprising:
   a plurality of display devices arranged in one direction, each of the plurality of display devices having a display area; and
   a plurality of image transmission means corresponding to the respective display devices, one end face of each of the image transmission means being coupled to a display area of the corresponding one of the display devices, other end faces of the image transmission means corresponding to the adjacent ones of the display devices being in contact with each other,
   the plurality of image transmission means being bent toward the one direction in which the display devices are arranged.

2. A display apparatus according to claim 1, wherein the image transmission means is formed by stacking a plurality of optical fiber sheets in which a plurality of optical fibers are arranged side by side.

3. A display apparatus according to claim 2, wherein the plurality of image transmission means are bent at an identical angle with one another, and a bending position of each of the plurality of the optical fiber sheets is gradually shifted.

4. A display apparatus comprising:
   a plurality of display devices disposed in two directions, each of the plurality of display devices having a display area;
   a plurality of image transmission means corresponding to the respective display devices, one end face of each of the image transmission means being coupled to a display area of the corresponding one of the display devices, other end faces of the image transmission means corresponding to the adjacent ones of the display devices being in contact with each other,
   some of the plurality of image transmission means each having inward facing slopes and outward facing slopes on two pairs of opposing faces, all of the outward facing slopes of the image transmission means being directed to a direction in which the corresponding display device has no adjacent display devices.

5. A display apparatus according to claim 4, wherein the image transmission means is formed by stacking a plurality of optical fiber sheets in which a plurality of the optical fibers are arranged side by side.

6. A display apparatus comprising:
   a display device having a display area; and
   image transmission means, one end face of the image transmission means being coupled to the display area, another end face of the image transmission means taking a convex and concave form;
   said image transmission means comprising
      an optical fiber bundle formed by stacking a plurality of optical fiber sheets in which a plurality of optical fibers are arranged side by side, and a sheet having the convex and concave form formed on one end face of the optical fiber bundle, wherein the convex and concave form has a predetermined period equal to a period of an arrangement of the optical fibers, a center portion in an end face of each of the optical fibers being protrudent, edge portions in an end face of each of the optical fibers being recessed.

7. A display apparatus comprising:

a display device having a display area; and an image transmission means comprising a plurality of light transmitters having only core portions and an adhesive member having a refractive index lower than that of the light transmitters, gaps between the plurality of light transmitters being filled with the adhesive member, one end face of the image transmission means being coupled to the display area;

wherein the adjacent core portions are in contact with each other.

8. A display apparatus comprising:

a display device having a display area; and image transmission means having anti-moisture permeation film on both end portions, one end face of the image transmission means being coupled to the display area, wherein the anti-moisture permeation film on at least one of the end portions has a two-layer structure.

9. A display apparatus comprising:

a display device having a display area;

image transmission means, one end face of the image transmission means being coupled to the display area; and sealing means covering a periphery of a portion where the image transmission means is coupled to the display area.

10. A method of producing an optical fiber sheet comprising the steps of:

bending an optical fiber sheet along a line in a direction across a surface of the optical fiber sheet, the optical fiber sheet being formed by arranging a plurality of optical fibers side by side, the line being distant from one end of the optical fiber sheet;

separating the bent optical fiber sheet into a plurality of bent optical fibers;

forming an optical fiber sheet having a bent line by arranging the plurality of bent optical fibers in a direction toward which the optical fibers are bent; and bending the optical fiber sheet having the bent line along the bent line in a direction across a surface of the optical fiber sheet.

11. A method of treating an end face of an optical fiber bundle comprising the steps of:

forming a photosensitive resin layer on one end face of the optical fiber bundle comprising a plurality of optical fibers having core and clad portions;

exposing part of the photosensitive resin layer on the core portion by introducing light from the other end face of the optical fiber bundle using the clad portions as a mask; and removing unexposed part of the photosensitive resin layer.

12. A method of producing an optical fiber bundle comprising the steps of:

putting optical fibers through a plurality of holes formed at the same positions in two plates;

bending the optical fibers at a desired angle by shifting one of the two plates;

fixing the bent optical fibers to each other using an adhesive; and removing the two plates.

13. A method of producing an optical fiber bundle according to claim 12, wherein the optical fibers have only core portions.

14. A method of producing an optical fiber bundle according to claim 12, wherein the two plates are superimposed on each other when the optical fibers are put through the plurality of holes, and the two plates are apart from each other when the one of the two plates is shifted.

15. A method of producing image transmission means comprising the steps of:

forming a first resin layer on an end of an optical fiber bundle;

cutting the first resin layer so as to make a face of the end even; and forming a second resin layer on the cut first resin layer.

* * * * *